(12) United States Patent
Kimura et al.

(10) Patent No.: US 11,165,325 B2
(45) Date of Patent: Nov. 2, 2021

(54) DRIVE APPARATUS HAVING DRIVE UNIT USING MAGNETIC CIRCUIT

(71) Applicant: CANON KABUSHIKI KAISHA, Tokyo (JP)

(72) Inventors: Masafumi Kimura, Kawasaki (JP); Kyosuke Sato, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 285 days.

(21) Appl. No.: 16/109,014

(22) Filed: Aug. 22, 2018

(65) Prior Publication Data

US 2019/0068042 A1    Feb. 28, 2019

(30) Foreign Application Priority Data

Aug. 28, 2017 (JP) .............................. JP2017-163481
Mar. 5, 2018 (JP) .............................. JP2018-038660

(51) Int. Cl.
*G02B 7/04* (2021.01)
*H02K 41/035* (2006.01)
(Continued)

(52) U.S. Cl.
CPC ....... *H02K 41/0354* (2013.01); *G02B 27/646* (2013.01); *G03B 5/00* (2013.01);
(Continued)

(58) Field of Classification Search
CPC ...... G02B 27/64; G02B 27/646; G02B 7/023; H04N 5/23287; G03B 5/00
See application file for complete search history.

(56) References Cited

U.S. PATENT DOCUMENTS

| 7,643,741 B2 | 1/2010 | Sekino |
| 9,742,257 B2 | 8/2017 | Shimoyama |
| 2016/0380524 A1 | 12/2016 | Duan |

FOREIGN PATENT DOCUMENTS

| CN | 101246293 A | 8/2008 |
| CN | 104682656 A | 6/2015 |

(Continued)

OTHER PUBLICATIONS

Office Action issued in Chinese Appln. No. 201810987378.3 dated Dec. 2, 2020. English translation provided.

(Continued)

*Primary Examiner* — Joseph P Martinez
(74) *Attorney, Agent, or Firm* — Rossi, Kimms & McDowell LLP

(57) ABSTRACT

A drive apparatus comprising a stationary frame with a coil, a movable frame with a magnetic circuit held movably in a direction orthogonal to a first direction, and a drive unit that moves the movable frame by applying electric current to the coil. The magnetic circuit is constituted by aligning a first magnet having a magnetization direction parallel to the first direction, a second magnet having a magnetization direction opposite to the first magnet, and a third magnet between the first and second magnets in a direction orthogonal to the first direction. The third magnet has a magnetization direction that has a pole in the same direction of the poles of the first and second magnets when viewed from the coil side. The side spaces of the first and second magnets opposite to the third magnet are occupied by material whose magnetic permeability is lower than the magnets.

12 Claims, 22 Drawing Sheets

(51) Int. Cl.
      *H04N 5/232*       (2006.01)
      *G03B 5/00*        (2021.01)
      *G02B 27/64*       (2006.01)

(52) U.S. Cl.
      CPC ..... *H02K 41/0356* (2013.01); *H04N 5/23209* (2013.01); *H04N 5/23258* (2013.01); *H04N 5/23287* (2013.01); *G03B 2205/0015* (2013.01); *G03B 2205/0038* (2013.01); *G03B 2205/0069* (2013.01)

(56) References Cited

FOREIGN PATENT DOCUMENTS

| | | | | |
|---|---|---|---|---|
| EP | 1286222 A1 | 2/2003 | | |
| JP | S6292757 A | 4/1987 | | |
| JP | H08211436 A | 8/1996 | | |
| JP | H09322443 A | * 12/1997 | ............... | H02K 1/17 |
| JP | H09322443 A | 12/1997 | | |
| JP | H10260445 A | 9/1998 | | |
| JP | 2003024871 A | 1/2003 | | |
| JP | 2010204157 A | 9/2010 | | |
| JP | 2012215911 A | 11/2012 | | |
| JP | 2014023238 A | 2/2014 | | |
| JP | 2017003821 A | 1/2017 | | |
| JP | 2017111183 A | * 6/2017 | ............... | G03B 5/00 |
| JP | 2017111183 A | 6/2017 | | |

OTHER PUBLICATIONS

Office Action issued in Japanese Appln. No. 2017-163481 dated Jun. 8, 2021.

\* cited by examiner

A-A'

B-B'

FIG. 15A
FIG. 15B
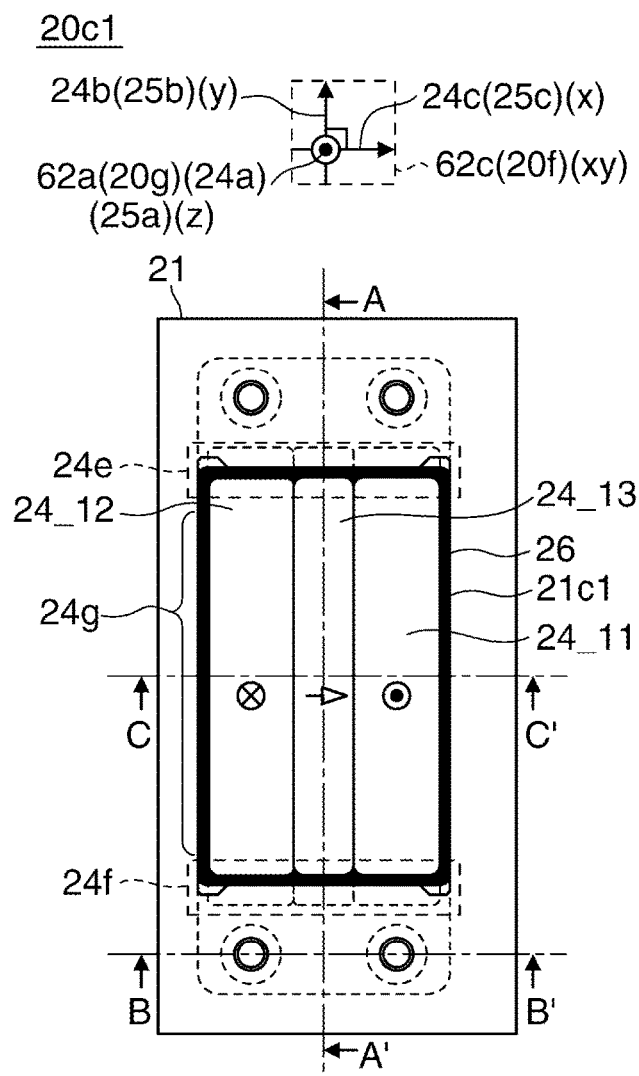
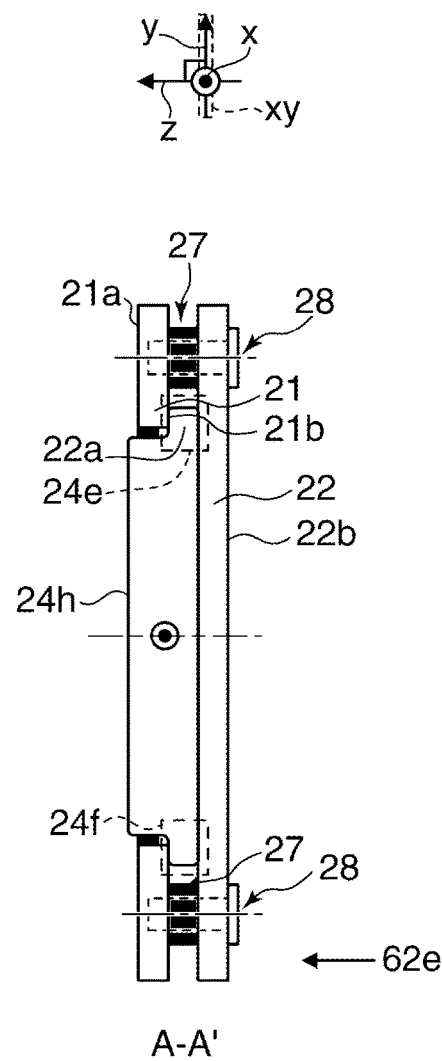

B-B'

C-C'

A-A'

A-A'

A-A'

A-A'

DRIVE APPARATUS HAVING DRIVE UNIT USING MAGNETIC CIRCUIT

BACKGROUND OF THE INVENTION

Field of the Invention

The present invention relates to a drive apparatus that is characterized in a magnetic circuit employed by a drive unit.

Description of the Related Art

Many image pickup apparatus and photographing lenses are provided with an antivibration device for stabilizing an image (i.e., for compensating image blur due to a camera shake) as performance of image pickup apparatuses increases in recent years. In many antivibration devices, a drive unit uses a voice coil motor (hereinafter referred to as a "VCM") and is so configured that a coil is arranged on one of a movable part and stationary part and a magnet is arranged on the other. Moreover, a driving apparatus that is capable of driving a target within a wider range is desired in order to increase performance of an antivibration device.

A drive unit of an antivibration device disclosed in Japanese Laid-Open Patent Publication (Kokai) No. H8-211436 (JP H8-211436A) has what is called a moving coil configuration in which a magnet is arranged on a stationary part and a coil is arranged on a movable part. Moreover, its magnetic circuit is so configured that two unipolar magnetized magnets are arranged on one drive unit.

A drive unit of an antivibration device disclosed in Japanese Laid-Open Patent Publication (Kokai) No. H10-260445 (JP H10-260445A) has what is called a moving magnet configuration in which a magnet is arranged on a movable part and a coil is arranged on a stationary part. Moreover, its magnetic circuit is so configured that one bipolar magnetized magnet is arranged on one drive unit.

The above configurations are typical magnetic circuits used for a drive unit of an antivibration device.

In the meantime, Japanese Laid-Open Patent Publication (Kokai) No. 2014-23238 (JP 2014-23238A) proposes a vibration generator that obtains a larger vibration by applying what is called a Hulbach array to a magnetic circuit as-is.

Moreover, Japanese Laid-Open Patent Publication (Kokai) No. 2010-204157 (JP 2010-204157A) discloses an antivibration device that improves a linearity of a position detecting sensor by providing a low-magnetized area in a middle of a driving magnet suitably.

However, the magnetic circuits shown in JP H8-211436A and JP H10-260445A have a problem of bad efficiency of the magnetic circuits due to large leakage magnetic flux, and a problem of bad linearity of position detection when used as a position detecting sensor.

It is preferable to apply the Hulbach array to a magnetic circuit as-is as disclosed in JP 2014-23238A in order to raise the efficiency of the magnetic circuit. However, since the antivibration device is not an endless track (i.e., the configuration does not repeat), the use as-is of the Hulbach array does not necessarily improve the efficiency because of influence of magnetic pole inversion.

Although the method of JP 2010-204157A improves the linearity of the position detecting sensor, the low-magnetized area lowers the magnetic flux density, which lowers thrust.

In the meantime, a stage apparatus that moves a movable part to a stationary part within a plane with electromagnetism driving force is used widely. A driving force generation unit of this stage apparatus may use the VCM. With this configuration, a magnet is arranged on one of the stationary part and movable part and a coil is arranged on the other, and driving force resulting from Lorentz force is generated and used by applying an electric current to the coil in a magnetic circuit formed by the magnet. Furthermore, it is general to control drives in a plurality of directions by arranging the plurality of driving force generation units.

An image stabilization mechanism in an image pickup apparatus is an example of use of such a stage apparatus. The stationary part of the stage apparatus is fixed to an optical axis of the image pickup apparatus, and an image stabilization lens or an image pickup device is held by the movable part so as to move within a plane orthogonal to the optical axis to perform image stabilization. Furthermore, Japanese Laid-Open Patent Publication (Kokai) No. 2017-3821 (JP 2017-3821A) discloses an arrangement of a magnetic field detecting element inside the coil in the driving force generation unit to detect change of the magnetic field in response to movement of the movable part that enables to detect a position of the movable part and to drivingly control the movable part without providing a position detection unit separately.

A theme of such a stage apparatus as an image stabilization mechanism of an image pickup apparatus is to improve an efficiency in the driving force generation unit and to improve linearity of the magnetic circuit for position detection. In order to achieve this theme, Japanese Laid-Open Patent Publication (Kokai) No. 2017-111183 (JP 2017-111183A) discloses a configuration that forms a magnetic circuit (hereinafter referred to as a "Hulbach magnetic circuit") using the concept of the Hulbach array by arranging three magnets for every driving force generation unit. This Hulbach magnetic circuit improves the efficiency of the driving force generation unit and improves the linearity of the magnetic circuit for the position detection.

However, since the Hulbach magnetic circuit in JP 2017-111183A requires to arrange the magnets in an unstable positional relationship in which the magnets mutually repel and to fix the magnets with adhesive, the arrangement of the magnets will shift gradually owing to creep deformation of the adhesive. Furthermore, variation of the magnetic circuit for position detection may lower the position detection accuracy gradually.

SUMMARY OF THE INVENTION

The present invention provides a drive apparatus that is capable of improving efficiency of a magnetic circuit by reducing leakage magnetic flux, so that an antivibration device saves power consumption and is downsized and improving linearity of position detection.

Moreover, the present invention provides a drive apparatus that is capable of stably fixing magnets that form a Hulbach magnetic circuit.

Accordingly, a first aspect of the present invention provides a drive apparatus comprising a stationary frame, a movable frame configured to be held by the stationary frame to be movable in a direction orthogonal to a first direction, and a drive unit configured to move the movable frame by applying electric current to a coil that is arranged on one of the stationary frame and the movable frame and that faces a magnetic circuit including magnets that is arranged on the other. The magnets are constituted by aligning a first magnet having a magnetization direction that is parallel to the first direction, a second magnet having a magnetization direction that is parallel to the first direction and is opposite to the magnetization direction of the first magnet, and a third magnet provided between the first magnet and the second magnet in a direction that intersects perpendicularly with the first direction. The third magnet has a magnetization direction in the direction that has a pole in the same direction of the poles of the first magnet and the second magnet when viewed from the coil side. The magnetic circuit is so configured that side spaces of the first and second magnets that are opposite to the third magnet are occupied by material of which magnetic permeability is lower than that of the first, second, and third magnets.

Accordingly, a second aspect of the present invention provides a drive apparatus comprising a stationary part configured to have a first stationary frame and a second stationary frame, a movable part configured to perform translational movement relative to the stationary part in a first direction, and a driving force generation unit configured to have a magnetic circuit fixed between the first and second stationary frames and a coil fixed to the movable part so as to face the magnetic circuit in a second direction that intersects perpendicularly with the first direction. The magnetic circuit is constituted by aligning a first magnet having a magnetization direction in the second direction, a second magnet having a magnetization direction opposite to the magnetization direction of the first magnet, and a third magnet provided between the first and second magnets. The third magnet has a magnetization direction in the direction that has a pole in the same direction of the poles of the first magnet and the second magnet when viewed from the coil side. Fixed parts are formed at both ends of the first and second magnets in a third direction that intersects perpendicularly with an alignment direction. The first and second stationary frames fix the magnetic circuit by nipping the fixed parts of the first and second magnets.

According to the first aspect of the present invention, the efficiency of the magnetic circuit is improved by reducing leakage magnetic flux, so that an antivibration device saves power consumption and is downsized, and the linearity of position detection is improved.

Moreover, according to the second aspects of the present invention, the magnets that form the Hulbach magnetic circuit are stably fixable.

Further features of the present invention will become apparent from the following description of exemplary embodiments with reference to the attached drawings.

BRIEF DESCRIPTION OF THE DRAWINGS

FIG. 15A through FIG. 15D are schematic views showing the first driving force generation unit in FIG. 12.

DESCRIPTION OF THE EMBODIMENTS

Hereafter, embodiments according to the present invention will be described in detail with reference to the drawings. It should be noted that the following embodiments do not restrict the scope of the present invention defined by the claims. All the combinations of features described in the following embodiments are not necessarily indispensable to the solutions of the present invention.

Hereinafter, an image pickup apparatus, which consists of a camera body and a lens unit attached to the camera body, to which a drive apparatus according to the present invention is applied will be described.

Figure 1A:
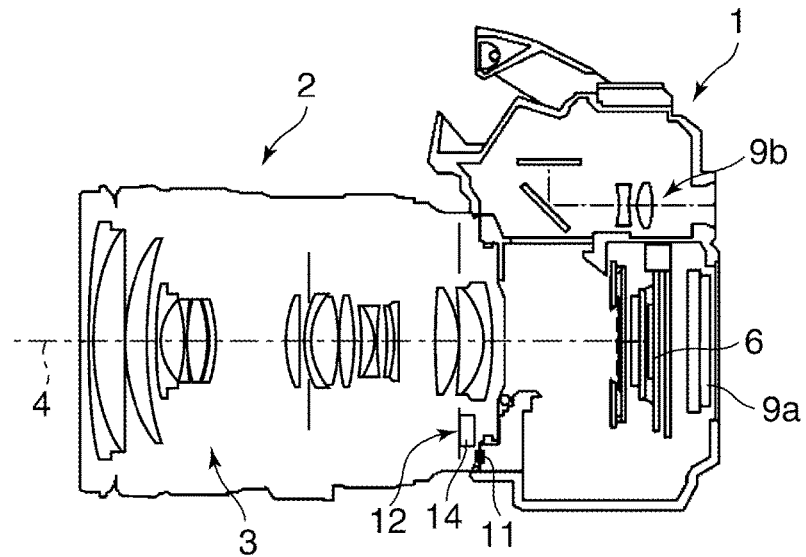
FIG. 1A and FIG. 1B are views for describing an image pickup apparatus that is provided with an antivibration device to which a drive apparatus of the present invention is applied.
Figure 1B:
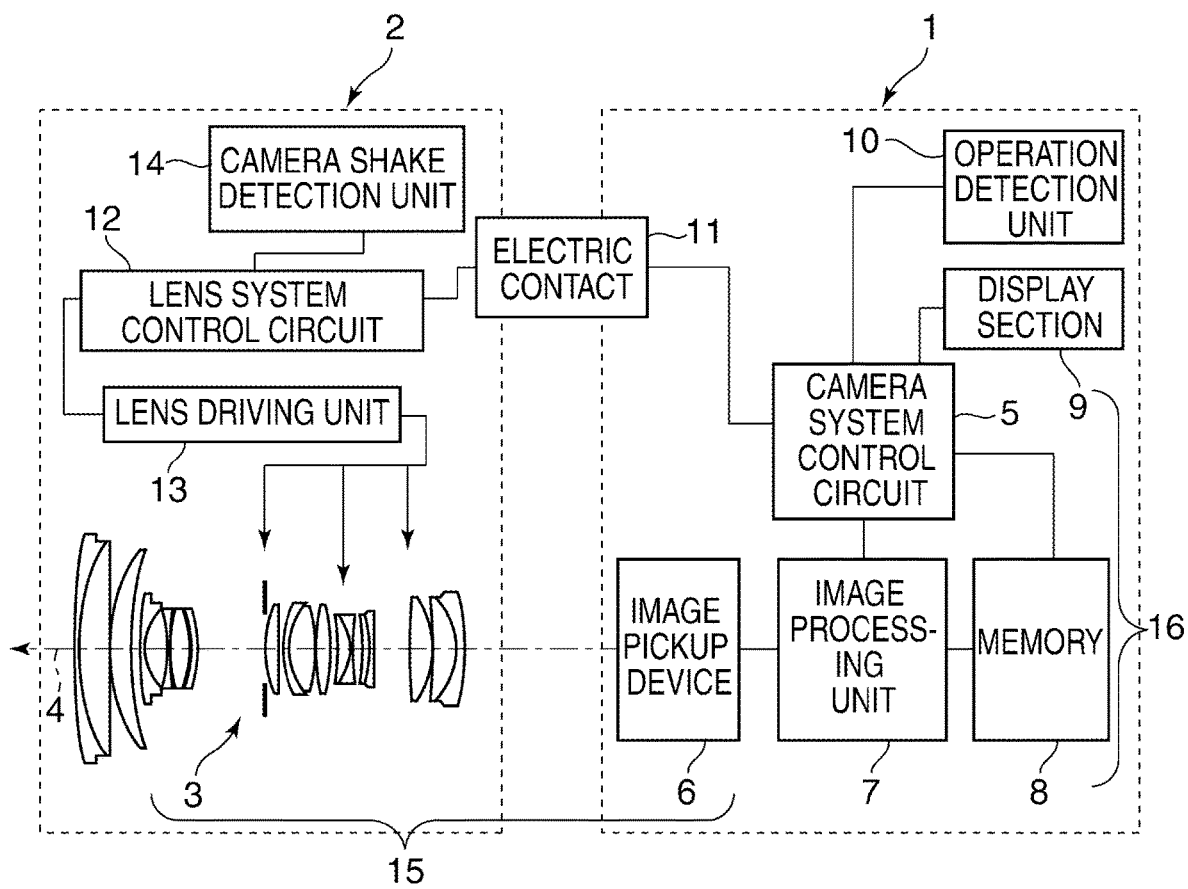

FIG. 1A is a central sectional view of the image pickup apparatus according to first, second, and third embodiments, and FIG. 1B is a block diagram showing an electric configuration of the image pickup apparatus. The same reference numerals are given to the same members in FIG. 1A and FIG. 1B.

As shown in FIG. 1A, the image pickup apparatus is provided with the camera body 1, the lens unit 2, and a photographing optical system 3 that consists of a plurality of lenses and is arranged inside the lens unit 2. Moreover, an image pickup device 6 is arranged on an optical axis 4 of the photographing optical system 3. The camera body 1 is provided with a rear display device 9a and an EVF 9b. The lens unit 2 is provided with a lens system control circuit 12 connected with the camera body 1 through an electric contact 11 and a camera shake detection unit 14.

As shown in FIG. 1B, the image pickup apparatus has an image pickup section 15, an image processing unit 7, a recording-reproducing section 16, and a control section. The image pickup section 15 includes the photographing optical system 3 and the image pickup device 6. The recording-reproducing section 16 includes a memory 8 and a display section 9 (the display section 9 includes the rear display device 9a and EVF 9b in FIG. 1A). Moreover, the control section includes a camera system control circuit 5, an operation detection unit 10, the lens system control circuit 12, a lens driving unit 13, and the camera shake detection unit 14. The lens driving unit 13 is able to drive a focus lens, an aperture, an image stabilization lens, etc. which are included in the photographing optical system 3. The lens driving unit 13 that drives the image stabilization lens corresponds to the antivibration device of the present invention.

The image pickup section 15 is an optical processing system that forms an image by the light from an object on an image pickup surface of the image pickup device 6 through the photographing optical system 3. Since a focus evaluation amount and a suitable exposure amount are obtained from the image pickup device 6, the photographing optical system 3 is appropriately adjusted on the basis of these amounts, which exposes the image pickup device 6 with the object light of the suitable light amount and forms an object image near the image pickup device 6.

The image processing unit 7 includes an A/D converter, a white balance adjustment circuit, a gamma correction circuit, an interpolation arithmetic circuit, etc., and is able to generate an image for recording. The image processing unit 7 generates a color image by applying a color interpolation (demosaicing) process to a signal of a Bayer arrangement. Moreover, the image processing unit 7 compresses an image, a moving image, a sound, etc. using a method defined beforehand. Furthermore, the image processing unit 7 is able to generate a shake detection signal on the basis of comparison between a plurality of images obtained from the image pickup device 6.

The memory 8 temporarily stores an image output from the camera system control circuit 5 and displays the image shown to a user on the display section 9.

The camera system control circuit 5 generates and outputs a timing signal for photographing, etc. and controls each of the image pickup unit 15, image processing unit 7, and recording-reproducing unit 16 in response to an operation from outside. For example, when the operation detection unit 10 detects a press of a shutter release button (not shown), the camera system control circuit 5 controls the drive of the image pickup device 6 and the compression process by the image processing unit 7, etc. Furthermore, the state of each segment of the image pickup apparatus is controlled by the display section 9. Moreover, the rear display device 9a is a touch panel, and is connected to the operation detection unit 10.

Next, an adjusting operation of the photographing optical system 3 by the control section will be described. The image processing unit 7 is connected to the camera system control circuit 5 and finds for a suitable focus position and an aperture position on the basis of the signal from the image pickup device 6. The camera system control circuit 5 issues a command to the lens system control circuit 12 through the electric contact 11. The lens system control circuit 12 controls the lens driving unit 13 appropriately. Furthermore, the lens system control circuit 12 controls the image stabilization lens appropriately through the lens driving unit 13 on the basis of the signal from the camera shake detection unit 14 in an image stabilization mode.

As mentioned above, a static image and a moving image are taken by controlling an action of each part of the camera body 1 in response to a user's operation to the operation detection unit 10.

Hereinafter, the antivibration device according to the first embodiment will be described. In the first embodiment, a Z-axis is parallel to the optical axis 4 of a photographing optical system (hereinafter referred to as an "optical axis", simply).

Figure 2:
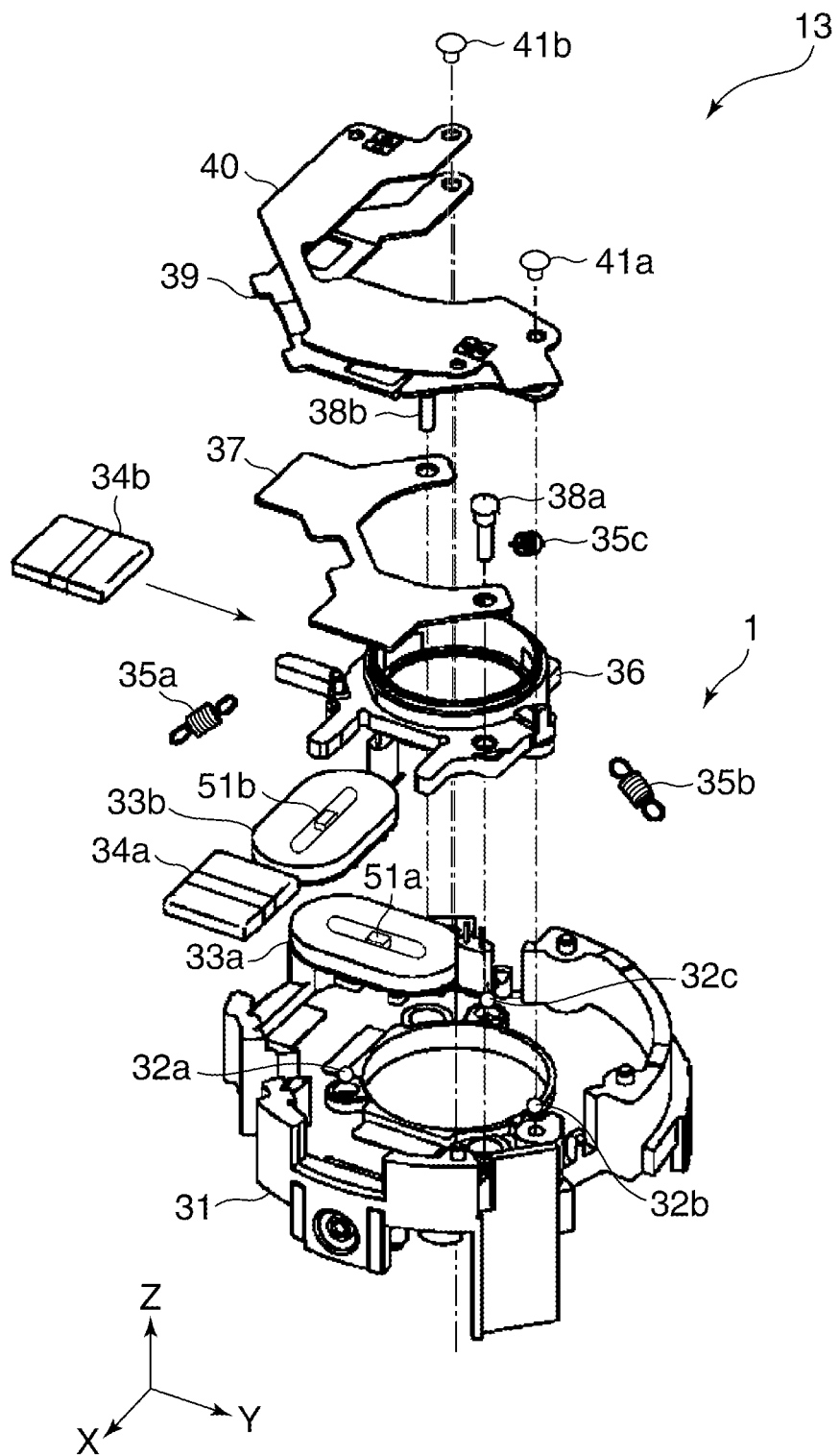
FIG. 2 is an exploded perspective view showing a part of a lens driving unit in FIG. 1 that functions as an antivibration device according to a first embodiment.

FIG. 2 is an exploded perspective view showing a part of the lens driving unit 13 in FIG. 1 that functions as the antivibration device according to the first embodiment.

As shown in FIG. 2, the lens driving unit 13 is provided with a stationary frame 31, a movable frame 36, balls 32a, 32b, and 32c nipped between the stationary frame 31 and the movable frame 36, coils 33a and 33b fixed to the stationary frame 31, and magnet assemblies 34a and 34b fixed to the movable frame 36. Moreover, the movable frame 36 is held resiliently by elastic bodies 35a, 35b, and 35c to the stationary frame 31. A magnet attraction plate (back yoke) 37 is attached to the movable frame 36 with attraction-plate fixing screws 38a and 38b. A moving-frame holding board 39 and an FPC 40 are attached to the movable frame 36 with the FPC fixing screws 41a and 41b. Magnetometric sensors 51a and 51b are respectively provided inside windings of the coils 33a and 33b. These magnetometric sensors 51a and 51b function as position sensors that detect the position of the movable frame 36. As clearly shown in FIG. 2, the members of the antivibration device of the first embodiment are arranged at only one side of the stationary frame 31 in an optical axis direction, so that the members are assembled easily. This improves productivity and enables reduction of cost. It should be noted that the first embodiment may employ LEDs 209a and 209b, and a PSD (Position Sensitive Device) that will be described in a second embodiment instead of the magnetometric sensors 51a and 51b.

The movable frame 36 is held resiliently by the plurality of elastic bodies. Specifically, the three elastic bodies 35a, 35b, and 35c are radially arranged at angular intervals of 120 degrees from the optical axis in the first embodiment. Such a symmetrical arrangement enables to reduce excitation of unnecessary resonance due to generation of moments. Moreover, the elastic bodies 35a, 35b, and 35c are suitably tilted in the optical axis direction and are attached so as to hold the three balls 32a, 32b, and 32c provided between the stationary frame 31 and the movable frame 36. Moreover, the three balls 32a, 32b, and 32c form guide faces so as to enable movement with a low friction coefficient due to rolling friction. The small friction enables appropriate response even for an extremely small input. Moreover, when the three balls 32a, 32b, and 32c are made in suitable accuracy, relative movement between the stationary frame 31 and the movable frame 36 does not generate tilt and unnecessary movement in the optical axis direction of the movable frame 36.

A part of the lens driving unit 13 that functions as a drive unit of the antivibration device will be described. The drive unit consists of the magnetic circuit that is formed by the coils 33a and 33b, the magnet assemblies 34a and 34b that are respectively opposite to the coils 33a and 33b, the magnet attraction plate 37, etc. As mention later with reference to FIG. 3A and FIG. 3B, each of the magnet assemblies 34a and 34b is formed from a plurality of magnets but is indicated by one symbol as a magnet unit that constitutes a magnetic circuit.

That is, although the drive unit of the first embodiment is what is called a moving magnet actuator in which the coils 33a and 33b are fixed to the stationary frame 31 and the magnet assemblies 34a and 34b are fixed to the movable frame 36, the configuration of the drive unit is not limited to this. For example, the drive unit may be a moving coil actuator that will be mentioned later with reference to FIG. 6 and FIG. 7.

Flowing electric current to the coils 33a and 33b generates force according to the Fleming's left-hand rule, so that the movable frame 36 moves relatively to the stationary frame 31. The two drive units enable the movements in two axial directions (within an XY plane in FIG. 2).

The configuration of the drive unit in the first embodiment and the configuration of the magnetic circuit that is a principal part thereof will be described with reference to FIG. 3.

Figure 3A:
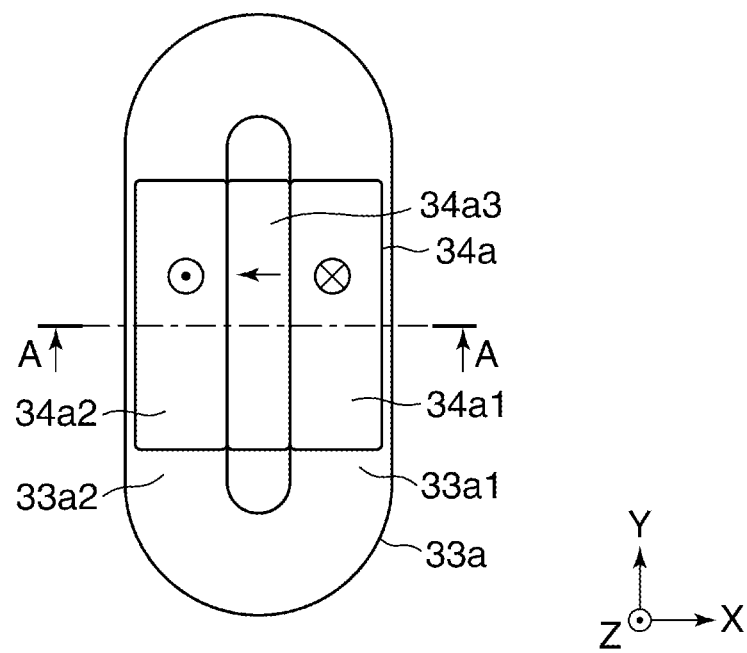
FIG. 3A and FIG. 3B are views for describing a configuration of a magnetic circuit included in a moving magnet actuator that functions as a drive unit of the antivibration device in FIG. 2.
Figure 3B:
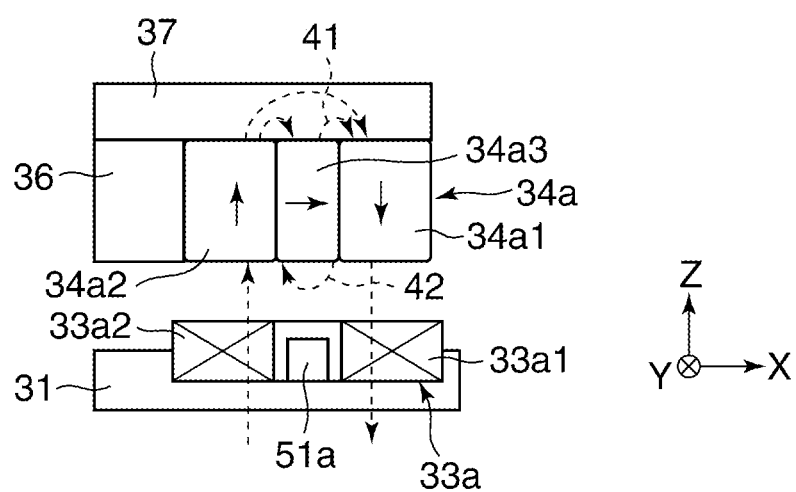

FIG. 3A and FIG. 3B are views for describing the configuration of the magnetic circuit included in the moving magnet actuator that functions as the drive unit of the antivibration device in FIG. 2. FIG. 3A and FIG. 3B shows the magnetic circuit including the magnet assembly 34a and the coil 33a in FIG. 2. The magnetic circuit including the magnet assembly 34b and the coil 33b in FIG. 2 has the same configuration except for the point that the X axis and the Y axis are exchanged.

FIG. 3A is a view showing only the magnet assembly 34a and the coil 33a viewed in the optical axis direction (direction that goes from a plus side to a minus side of the Z-axis). FIG. 3B is a sectional view taken along the line A-A in FIG. 3A.

As shown in FIG. 3A and FIG. 3B, the coil 33a has two longitudinal parts 33a1 and 33a2, and the magnet assembly 34a is provided with first, second, and third magnets 34a1, 34a2, and 34a3. All broken lines with arrows including magnetic field lines 41 and 42 show magnetic field lines schematically.

The magnet assembly 34a in the exploded perspective view of FIG. 2 consists of the three magnets that are the first, second, third magnets 34a1, 34a2, and 34a3 aligned in a direction orthogonal to the optical axis direction (the X direction in the first embodiment). The first magnet 34a1 has a magnetization direction in a direction parallel to the optical axis. The second magnet 34a2 has a magnetization direction that is in the direction parallel to the optical axis and is opposite to that of the first magnet 34a1. Furthermore, the third magnet 34a3 is provided between the first magnet 34a1 and the second magnet 34a2. The third magnet 34a3 has a magnetization direction in the direction that has a pole in the same direction of the poles of the first magnet 34a1 and the second magnet 34a2 when viewed from the coil 33a side. That is, the surface of the first magnet 34a1 that faces the coil 33a exhibits an N pole, and the surface of the second magnet 34a2 faces the coil 33a exhibits an S pole. In the meantime, the surface of the third magnet 34a3 that contacts the first magnet 34a1 exhibits the N pole, and the surface of the third magnet 34a3 that contacts the second magnet 34a2 exhibits the S pole.

The two longitudinal parts 33a1 and 33a2 of the coil 33a approximately face the first and second magnets 34a1 and 34a2, respectively. Moreover, the magnet attraction plate 37 is arranged at the side of the first, second, and third magnets 34a1, 34a2, and 34a3 that is opposite to the side facing the coil 33a. The magnet attraction plate 37 is made from material whose magnetic permeability is higher than a vacuum and is preferably made from soft magnetic material. This allows transmission of much magnetic flux and improves the efficiency of the magnetic circuit.

Since the magnet attraction plate 37 is fixed to the movable frame 36 in the first embodiment, the weight of the movable frame 36 increases as the thickness increases. Accordingly, it is preferable to decide the thickness of the magnet attraction plate 37 so that the magnetic flux will be almost saturated in consideration of the shape of the magnet attraction plate 37, saturation magnetic flux density, the shapes of the magnets, residual magnetic flux density, etc. When electric current is applied to the coil 33a in this state, the electric current flows through the two longitudinal parts 33a1 and 33a2 of the coil 33a in the opposite directions orthogonal to the sheet of FIG. 3B. For example, when the electric current flows through the one longitudinal part 33a1 of the coil 33a in the front-to-back direction orthogonal to the sheet, the electric current flows through the other longitudinal part 33a2 of the coil 33 in the back-to-front direction orthogonal to the sheet. Thereby, driving force occurs by the Fleming's left-hand rule. As described with reference to FIG. 2, the movable frame 36 to which the magnet assembly 34a is fixed is held resiliently by the elastic bodies 35a, 35b, and 35c. Accordingly, the movable frame 36 moves relatively to the stationary frame 31 to a position at which the resultant force of the elastic bodies 35a, 35b, and 35c is balanced with the driving force.

The magnetic circuit in the first embodiment is characterized in that the third magnet 34a3 is provided. The effect of the third magnet 34a3 will be described with reference to FIG. 3B. Moreover, another characteristic feature is the magnetometric sensor 51a. The magnetometric sensor 51a is located at the same side as the coil 33a when viewed from the magnetic circuit in the first embodiment. More specifically, the magnetometric sensor 5 is located at the position that overlaps with the third magnet 34a3 when projected in the optical axis direction and is located inside the coil 33a when viewed in the optical axis direction. The magnetometric sensor 51a is a sensor (a Hall element, for example) of which an output is proportional to the magnetic flux density in the Z direction.

Next, arrangements of the first, second, and third magnets 34a1, 34a2, and 34a3 will be described. The surfaces at the side of the magnet attraction plate 37 are focused first. The surface of the first magnet 34a1 that faces the magnet attraction plate 37 exhibits the S pole. The surface of the second magnet 34a2 that faces the magnet attraction plate 37 exhibits the N pole. In the meantime, the surface of the third magnet 34a3 that contacts the first magnet 34a1 exhibits the N pole, and the surface of the third magnet 34a3 that contacts the second magnet 34a2 exhibits the S pole. At the side of the magnet attraction plate 37, the third magnet 34a3 generates the flow of the magnetic flux shown by the magnetic field line 41. That is, since the poles that mutually attract are adjacent, the magnetic field lines that are appeared from the first magnet 34a1 and the second magnet 34a2 at the side of the magnet attraction plate 37 are immediately absorbed by the third magnet 34a3. If the third magnet 34a3 is not provided, all magnetic field lines pass along the inside of the magnet attraction plate 37. In the meantime, in the first embodiment, a part of the magnetic flux goes toward the first magnet 34a1 from the second magnet 34a2 via the third magnet 34a3. This enables to thin down the magnet attraction plate 37 as compared with the configuration that does not provide the third magnet 34a3. The size of the magnet attraction plate 37 in the Z direction (thickness direction) is able to be smaller than the sizes of the first, second, and third magnets 34a1, 34a2, and 34a3 in the Z direction (thickness direction).

Next, the surfaces that face the coil 33a are focused. At the side facing the coil 33a, the third magnet 34a3 generates the flow of the magnetic flux shown by the magnetic field line 42. The magnetic flux that is schematically shown by the magnetic field line 42 comes out from the N pole of the third magnet 34a3 (the surface adjacent to the first magnet 34a1) and goes toward the S pole of the third magnet 34a3 (the surface adjacent to the second magnet 34a2). Since the poles that mutually repulse are adjacent, the magnetic field lines that are appeared from the first magnet 34a1 and the second magnet 34a2 at the side of the coil 33a are obstructed by the magnetic field line 42 and cannot immediately go toward the second magnet 34a2 from the first magnet 34a1. As a result, a linear magnetic field line occurs toward the coil 33a from the first magnet 34a1 and the second magnet 34a2. That is, more magnetic flux goes toward the coil 33a as compared with the case where the third magnet 34a3 is not provided. Namely, the efficiency of the magnetic circuit is improved by reducing the leakage flux. The leakage flux means the magnetic flux that does not go to the coil 33a and does not contribute to the driving force.

As mentioned above, the magnetic circuit has closed at the side of the magnet attraction plate 37. That is, since the magnetic flux leaks but the linearity is not maintained, it is not suitable for position detection. In the meantime, since the side facing the coil 33a is formed so that the magnetic field line from the magnetic circuit will go in the Z direction, it is suitable for position detection. That is, it is preferable to arrange the magnetometric sensor 51a at the same side as the coil 33a when viewed from the magnetic circuit.

Moreover, as clearly shown in FIG. 1A through FIG. 3B, the magnetic circuit of the first embodiment is so configured that the side spaces of the first and second magnets 34a1 and 34a2 that are opposite to the third magnet 34a3 are occupied by material of which magnetic permeability is lower than that of the first, second, and third magnets 34a1, 34a2, and 34a3. As shown in FIG. 3B, the side space of the first magnet 34a1 that is opposite to the third magnet 34a3 is occupied by air, and the side space of the second magnet 34a2 that is opposite to the third magnet 34a3 is occupied by the movable frame 36. Since the movable frame 36 in the first embodiment is made from resin, the space is occupied by the material of which magnetic permeability is lower than that of the magnets. According to such a configuration, the magnetic fluxes come from the surfaces of the first and second magnets 34a1 and 34a2 to the side of the coil 33 go toward the coil 22 linearly without being attracted in the horizontal direction in FIG. 3B. This configuration improves the efficiency of the magnetic circuit by reducing a leakage flux.

Figure 4A:
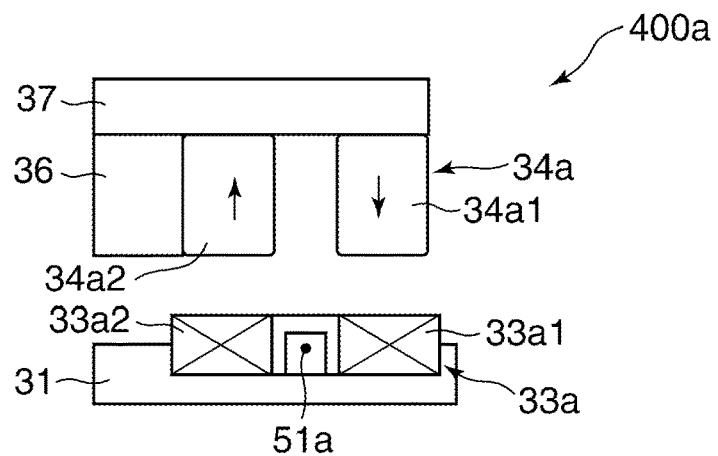
FIG. 4A, FIG. 4B, and FIG. 4C are views for describing configurations of magnetic circuits of related arts.
Figure 4B:
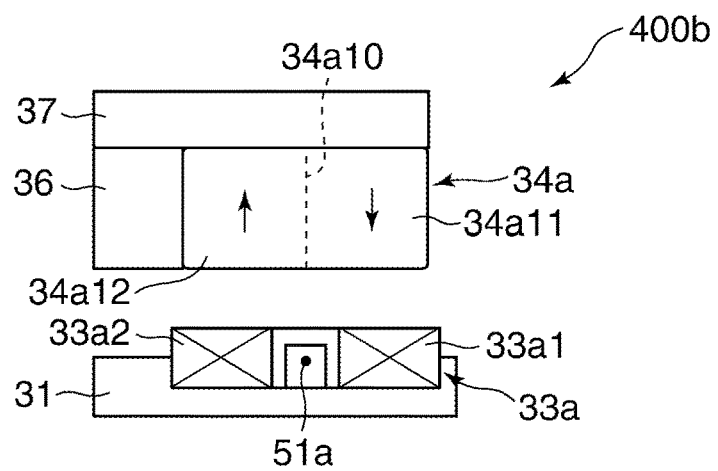
Figure 4C:
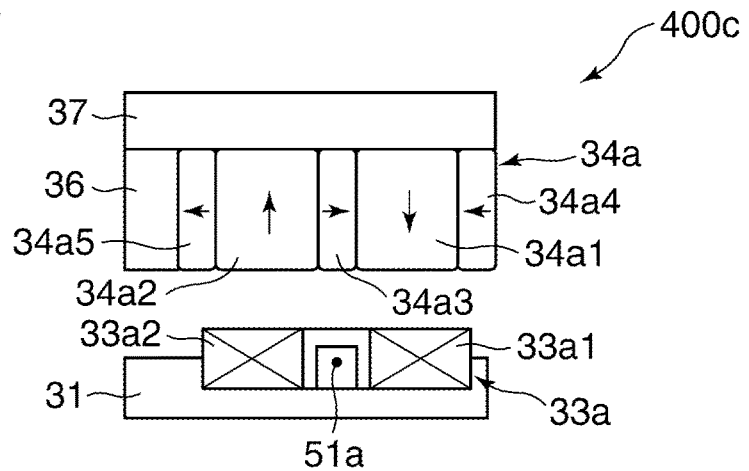

FIG. 4A, FIG. 4B, and FIG. 4C are views for describing configurations of magnetic circuits of related arts. Each magnetic circuit shown in FIG. 4A, FIG. 4B, and FIG. 4C is shown as a sectional view similar to FIG. 3B. Moreover, in FIG. 4A, FIG. 4B, and FIG. 4C, the same reference numerals are given to the elements that are identical to the elements in FIG. 3B.

A magnetic circuit 400a in FIG. 4A is configured to arrange a first magnet 34a1 and a second magnet 34a2 with an air gap therebetween. The first magnet 34a1 has a magnetization direction in a direction parallel to the optical axis. The second magnet 34a2 has a magnetization direction that is opposite to the magnetization direction of the first magnet 34a1 and is parallel to the optical axis. That is, the magnetic circuit 400a is configured by excluding the third magnet 34a3 from the magnetic circuit of the first embodiment. A magnetic flux density of the magnetic circuit 400a becomes lower than that of the configuration shown in FIG. 3B, as mentioned later.

A magnetic circuit 400b shown in FIG. 4B has one bipolar magnetized magnet. As shown in FIG. 4B, the magnet assembly 34a has a first area 34a11 and a second area 34a12 that are separated by a magnetization boundary 34a10. The first area 34a11 has a magnetization direction parallel to the optical axis. The second area 34a12 has a magnetization direction that is opposite to the magnetization direction of the first area 34a11 and is parallel to the optical axis. That is, the magnetic circuit 400b is configured by excluding the third magnet 34a3 from the magnetic circuit of the first embodiment and by replacing the two magnets with the magnet assembly 34a that has two areas 34a11 and 34a12 that are magnetized in opposite directions (bipolar magnetization). A magnetic flux density of the magnetic circuit 400b becomes lower than that of the configuration shown in FIG. 3B, as mentioned later.

A magnetic circuit 400c shown in FIG. 4C is provided with first, second, and third magnets 34a1, 34a2, and 34a3 that have the same arrangement as the first embodiment, and first and second array magnets 34a4 and 34a5 that have a magnetization direction opposite to the magnetization direction of the third magnet 34a3. That is, the magnets of the magnetic circuit 400c constitute a Hulbach array. The Hulbach array defines a configuration (array) that is repeated infinitely. Since the second array magnet 34a5 and the first array magnet 34a4 have the same magnetization direction, the magnetization direction of the next magnet is defined as a repeated configuration. That is, when the next (left side in FIG. 4C) to the second array magnet 34a5 is assumed, the magnet having the same magnetization direction as the first magnet 34a1 is considered. In the meantime, when the next (right side in FIG. 4C) to the first array magnet 34a4 is assumed, the magnet having the same magnetization direction as the second magnet 34a2 is considered. The configuration that is infinitely repeated (endless track) similarly is defined. The magnetic circuit of the first embodiment that consists of only three magnets is not appropriate to be called the Hulbach array because the endless track shown in FIG. 4C cannot be defined. The Hulbach array is an extremely efficient configuration when it is used by the endless track as mention later, but it is not necessarily efficient when it is used by what a configuration does not repeat like an anti-vibration device. As a result, a magnetic flux density of the magnetic circuit 400c becomes lower than that of the configuration shown in FIG. 3B, as mentioned later.

Relationships between the magnetic flux densities of the above-mentioned magnetic circuits and the coils, and the forces occur when the magnetic circuits are used as the magnetic circuit of the lens driving unit 13 in FIG. 1B (hereinafter, referred to as "driving force" simply), and the relation with the position detection will be described with reference to FIG. 5.

Figure 5:
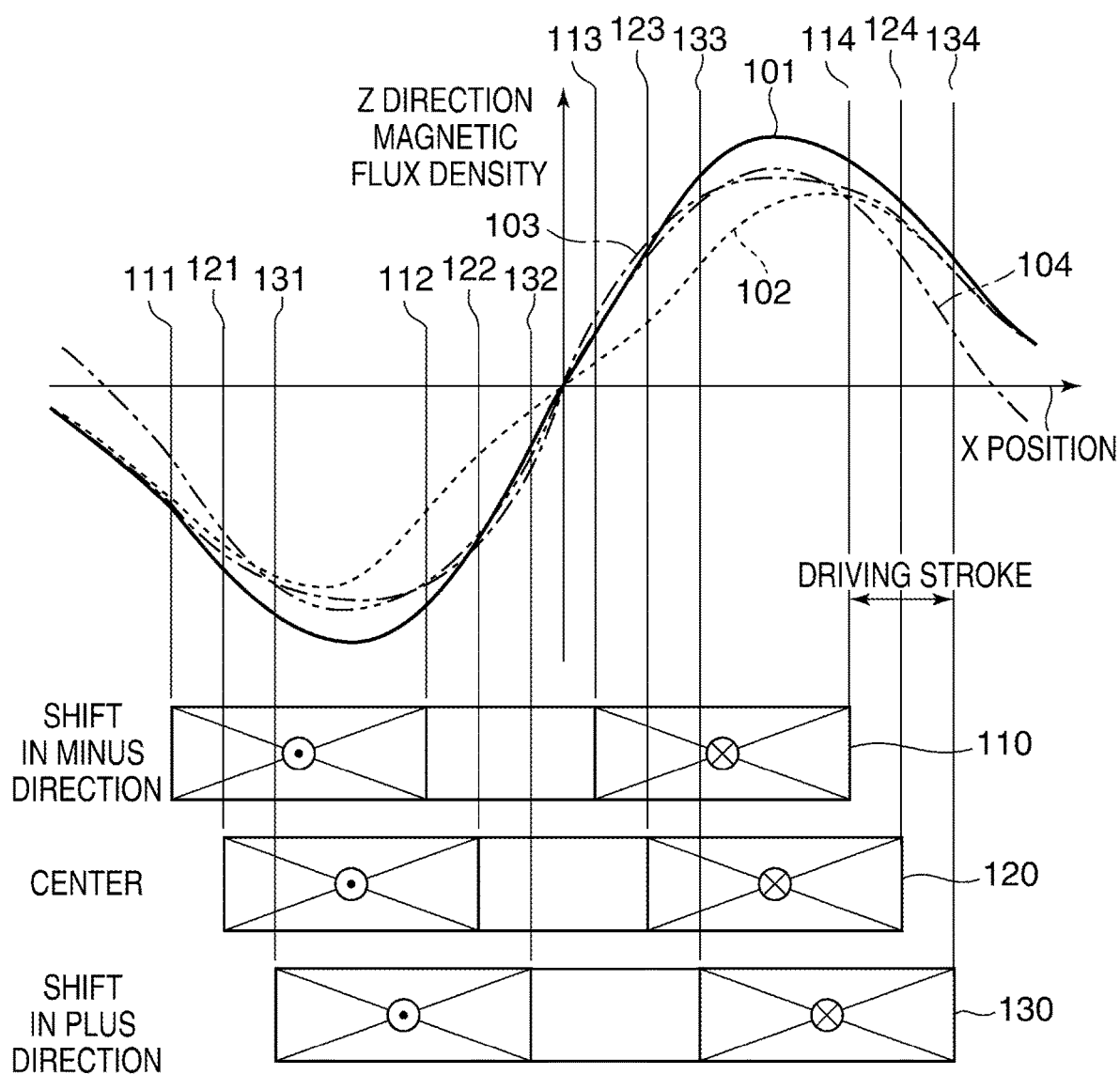
FIG. 5 is a view schematically showing magnetic flux densities and driving forces that occur in the respective magnetic circuits shown in FIG. 3B and FIG. 4A, FIG. 4B, and FIG. 4C.

FIG. 5 is a view schematically showing magnetic flux densities and driving forces that occur in the respective magnetic circuits shown in FIG. 3B and FIG. 4A, FIG. 4B, and FIG. 4C.

An upper part in FIG. 5 is a graph showing the magnetic flux densities in the Z direction, and a lower part schematically shows the positions of the coil 33a. The graph in FIG. 5 shows values obtained by magnetic-field simulation or actual measurement.

The graph shown in the upper part in FIG. 5 consists of a horizontal axis that shows a position (hereinafter referred to as an "X position") in the X direction of which an origin is the center of the magnetometric sensor 51a in FIG. 3B and a vertical direction that shows a magnetic flux density in the Z direction at an X position. A plus sign of a magnetic flux density means that a magnetic flux goes in a downward direction in FIG. 3B. As mentioned above with reference to FIG. 3B, the magnetic circuit in the first embodiment generates the driving force by what is called a Fleming's left-hand rule. Since only the magnetic flux in the Z direction contributes to the driving force, the graph shown in the upper part in FIG. 5 shows only the magnetic flux densities in the Z direction.

The graph in FIG. 5 shows a curve 101 showing a magnetic flux density of the magnetic circuit of the first embodiment shown in FIG. 3B, a curve 102 showing a magnetic flux density of the magnetic circuit 400a that employs the two magnets shown in FIG. 4A, a curve 103 showing a magnetic flux density of the magnetic circuit 400b that employs the bipolar magnetized magnet shown in FIG. 4B, and a curve 104 showing a magnetic flux density of the magnetic circuit 400c that employs the Hulbach array shown in FIG. 4C.

Moreover, a position 110 showing the coil 33a that is displaced to minus in the X direction, a position 120 showing the coil 33a that is near the center of the stroke in the X direction, and a position 130 showing the coil 33a that is displaced to plus in the X direction are shown in the lower part in FIG. 5. Additional lines 111, 112, 113, and 114 are shown for describing the driving-force generation at the position 110 showing the coil 33a that is displaced to minus. Moreover, additional lines 121, 122, 123, and 124 are shown for describing the driving-force generation at the position 120 showing the coil 33a that is at the center of the stroke. Similarly, additional lines 131, 132, 133, and 134 are shown for describing the driving-force generation at the position 130 showing the coil 33a that is displaced to plus.

As clearly shown in FIG. 5, the peaks of the curve 101 showing the magnetic flux density of the magnetic circuit of the first embodiment exceed the peaks of the curves 102, 103, and 105 showing the magnetic flux densities of the magnetic circuits 400a, 400b, and 400c shown in FIG. 4A, FIG. 4B, and FIG. 4C. In the meantime, the magnetic circuit 400b that uses the bipolar magnetized magnet obtains the highest result about the rise of the magnetic flux density near the origin (X=0) as shown by the curve 103. The values of the curve 102 showing the magnetic flux density of the magnetic circuit 400a that employs the two magnets shown in FIG. 4A are lower than the curve 101 showing the magnetic flux density of the magnetic circuit of the first embodiment at any X positions. The curve 104 showing the magnetic flux density of the magnetic circuit 400c that uses the Hulbach array shown in FIG. 4C shows a tendency similar to the curve 101 of the magnetic circuit of the first embodiment in an area where absolute values of X positions are small. However, the magnetic flux density shown by the curve 104 decreases rapidly and the sign is inverted in areas where the absolute values of the X positions are large.

Generation of driving force will be considered. The driving force when the coil 33a is displaced to the minus position 110 is computable as an integration value of the absolute values of the curve 101, 102, 103, or 104 showing the magnetic flux density within the area inserted into the additional lines 111 and 112 and the area inserted into the additional lines 113 and 114. Similarly, the driving force when the coil 33a is at the position 120 near the center of the stroke is computable as an integration value of the absolute values of the curve 101, 102, 103, or 104 showing the magnetic flux density within the area inserted into the additional lines 121 and 122 and the area inserted into the additional lines 123 and 124. Similarly, the driving force when the coil 33a is displaced to the plus position 130 is computable as an integration value of the absolute values of the curve 101, 102, 103, or 104 showing the magnetic flux density within the area inserted into the additional lines 131 and 132 and the area inserted into the additional lines 133 and 134. The driving force of the magnetic circuit of the first embodiment is superior in comparison with that of the magnetic circuits 400a, 400b, and 400c in any positions.

A relation between the curve 102 showing the magnetic flux density of the magnetic circuit 400a that uses the two magnets and the curve 101 showing the magnetic flux density of the magnetic circuit of the first embodiment will be described. The magnetic circuit of the first embodiment has advantage in respect of a compact, efficient magnetic circuit. In the meantime, as is evident from comparison of FIG. 3B and FIG. 4A, the magnetic circuit 400a that uses the two magnets is made at lower cost than the magnetic circuit of the first embodiment because of fewer components. Since the larger magnetic circuit and coil generate larger driving force, it is worth using the magnetic circuit 400a that uses the two magnets that is constitutable at lower cost when the large space is secured for arranging the magnetic circuit. In the meantime, when a miniaturization of an apparatus is desired, the magnetic circuit of the first embodiment has an advantage.

A relation between the curve 103 showing the magnetic flux density of the magnetic circuit 400b that uses the bipolar magnetized magnet and the curve 101 showing the magnetic flux density of the magnetic circuit of the first embodiment will be described. The magnetic flux density of the magnetic circuit 400b that uses the bipolar magnetized magnet is higher in the area where the absolute values of the X positions are small. Accordingly, if this area is utilizable, the magnetic circuit 400b is more preferable than the magnetic circuit of the first embodiment. However, it is not easy to utilize this area in an antivibration device.

That is, the movable frame 36 and the stationary frame 31 are relatively displaced in an antivibration device. An antivibration device is designed so that the driving force does not change extremely for a purpose of stabilization of a servo system. In order to achieve this, the coil 33a is wound so as to have a cavity at the center. Accordingly, as shown in FIG. 3B, the cavity is provided between the longitudinal parts 33a1 and 33a2 of the coil 33a. In order to use the area where the absolute values of the X positions are small, it is preferable to make the cavity small. However, if the cavity is made extremely small, the magnetic flux in one direction gives influence of the magnetic flux of the opposite direction. Specifically, the additional line 113 in FIG. 5 enters the negative area or the additional line 132 enters the positive area. In such a case, the force that occurs in the coil 33a will be offset and driving force will lower extremely.

Although the magnetic flux density of the magnetic circuit 400b is higher than that of the magnetic circuit of the first embodiment in the area where the absolute values of the X positions are small, an antivibration device cannot utilize this area effectively. As a result, the magnetic flux density of the magnetic circuit 400b is inferior to the magnetic circuit of the first embodiment in the area of the coil 33a. Accordingly, the magnetic circuit of the first embodiment has advantage in respect of a compact, efficient magnetic circuit. In the meantime, as is evident from comparison of FIG. 3B and FIG. 4B, the magnetic circuit 400b that uses the bipolar magnetized magnet is made at lower cost than the magnetic circuit of the first embodiment because of fewer components. Since the larger magnetic circuit and coil generate larger driving force, it is worth using the magnetic circuit 400b that uses the bipolar magnetized magnet that is constitutable at lower cost when the large space is secured for arranging the magnetic circuit. In the meantime, when a miniaturization of an apparatus is desired, the magnetic circuit of the first embodiment has an advantage.

A relation between the curve 104 showing the magnetic flux density of the magnetic circuit 400c that uses the Hulbach array and the curve 101 showing the magnetic flux density of the magnetic circuit of the first embodiment will be described. As shown in FIG. 5, the magnetic flux density of the magnetic circuit 400c that uses the Hulbach array decreases rapidly and the sign is inverted in the areas where the absolute values of the X positions are large. This is because the Hulbach array was considered as an efficient magnetic circuit on the assumption of an infinite repetition. When the Hulbach array is applied to a linear motor or a rotary motor, the areas in which the magnetic flux density is reversed are utilized effectively. For example, since coils are also arranged repeatedly in a motor, driving force is obtained by integrating the magnetic flux density even in the reversed areas. In the meantime, a drive unit of an antivibration device has a configuration called a flat VCM and does not have a repetition configuration. Accordingly, the drive unit of the antivibration device increases the driving force by occupying the outside spaces by material of which the magnetic permeability is low without arranging magnets rather than using a part of the Hulbach array. Accordingly, the magnetic circuit of the first embodiment obtains the higher driving force than the magnetic circuit 400c that uses the Hulbach array.

Next, a relationship with position detection will be described. As is evident from FIG. 5, the curve 102 showing the magnetic flux density of the magnetic circuit 400a that uses the two magnets shown in FIG. 4A bends near the origin of the X position. Since the position detection needs high linearity between an X position and a magnetic flux density, the magnetic circuit 400a is not suitable for the position detection.

Next, the curve 103 showing the magnetic flux density of the magnetic circuit 400b that uses the bipolar magnetized magnet described in FIG. 4B and the curve 104 showing the magnetic flux density of the magnetic circuit 400c that uses the Hulbach array described in FIG. 4C are focused. Each of the curves 103 and 104 draws an S shape as a whole and is mostly and linearly approximated near the origin. Furthermore, the curve 101 showing the magnetic flux density in the magnetic circuit of the first embodiment described in FIG. 3B draws an S shape as a whole and has a linear area that is wider than that of the curves 103 and 104 near the origin. That is, the magnetic circuit of the first embodiment described in FIG. 3B has a wider area in which high linearity between an X position and a magnetic flux density is secured in comparison with the magnetic circuits 400b and 400c.

Accordingly, the magnetic circuit of the first embodiment has the higher accuracy of position detection in comparison with the magnetic circuits 400a, 400b, and 400c.

Next, the size of the third magnet 34a3 that is a characteristic feature of the magnetic circuit of the first embodiment will be described.

If the size (X size) of the third magnet 34a3 in the driving force generation direction becomes zero, the magnetic circuit becomes almost the same as the state with the bipolar magnetized magnet shown in FIG. 4B. In the meantime, if the size (X size) of the third magnet 34a3 in the driving force generation direction becomes extremely large, the magnetic flux from the first and second magnet 34a1 and 34a2 decreases relatively, which decreases the magnetic flux in the Z direction. It is preferable that the magnetic field line 42 in FIG. 3B is suitably generated and that the magnetic flux from the first and second magnets 34a1 and 34a2 does not draw a loop (i.e., the magnetic flux is directed to the coil 33a straightly). As results of numerical calculations and actual measurements, the size of the third magnet 34a3 is decided to be smaller than the size of the first (second) magnet 34a1 (34a2) and larger than the half size of the first (second) magnet 34a1 (34a2) in the driving force generation direction. FIG. 3B is illustrated on such conditions.

A relationship with the size of the coil 33a is considered. As mentioned in the description about FIG. 5, the coil 33a is formed to have the cavity at the center so that a rapid change of the driving force may be avoided. Many of coils used for a drive unit of an antivibration device are shaped as an ellipse like a truck of track and field. As mentioned in the description about FIG. 5, the cavity size is defined in relation with the driving stroke. In the meantime, if the size of the third magnet 34a3 is made small, the magnetic flux density near the coil cavity is improved as mentioned in the description about FIG. 5 about the magnetic flux density of the magnetic circuit 400b that uses the bipolar magnetized magnet. As results of numerical calculations and actual measurements, the size of cavity is decided to be nearly equal to the size of the third magnet 34a3 in the driving force generation direction in order to enlarge the driving force. FIG. 3B is illustrated on such conditions.

Although the first embodiment exemplifies the image pickup apparatus as an optical apparatus, the optical apparatus is not limited to the image pickup apparatus as long as an optical apparatus needs an antivibration device as an image stabilization mechanism that functions when an image is obtained through a lens. For example, an optical apparatus may be a microscope, binocular, or telescope.

Furthermore, although the antivibration device according to the first embodiment suppresses a vibration in a direction that intersects perpendicularly with the optical axis of the optical apparatus in order to prevent the influence of a camera shake, the antivibration device is not limited to this as long as the device suppresses a vibration in a direction that intersects perpendicularly with a direction (first direction) of a supporting shaft. For example, the antivibration device may be applied to light emission devices that illuminate a target, such as a laser pointer, a tracking searchlight, and an LIDAR.

Hereinafter, an antivibration device according to the second embodiment will be described with reference to FIG. 6. Although the first embodiment employs the moving magnet actuator as the drive unit, the second embodiment employs a moving coil actuator. Moreover, although the first embodiment employs the magnetometric sensors 51a and 51b as position sensors, the second embodiment employs PSDs as mentioned below. The above points are differences between the first and second embodiments.

Figure 6:
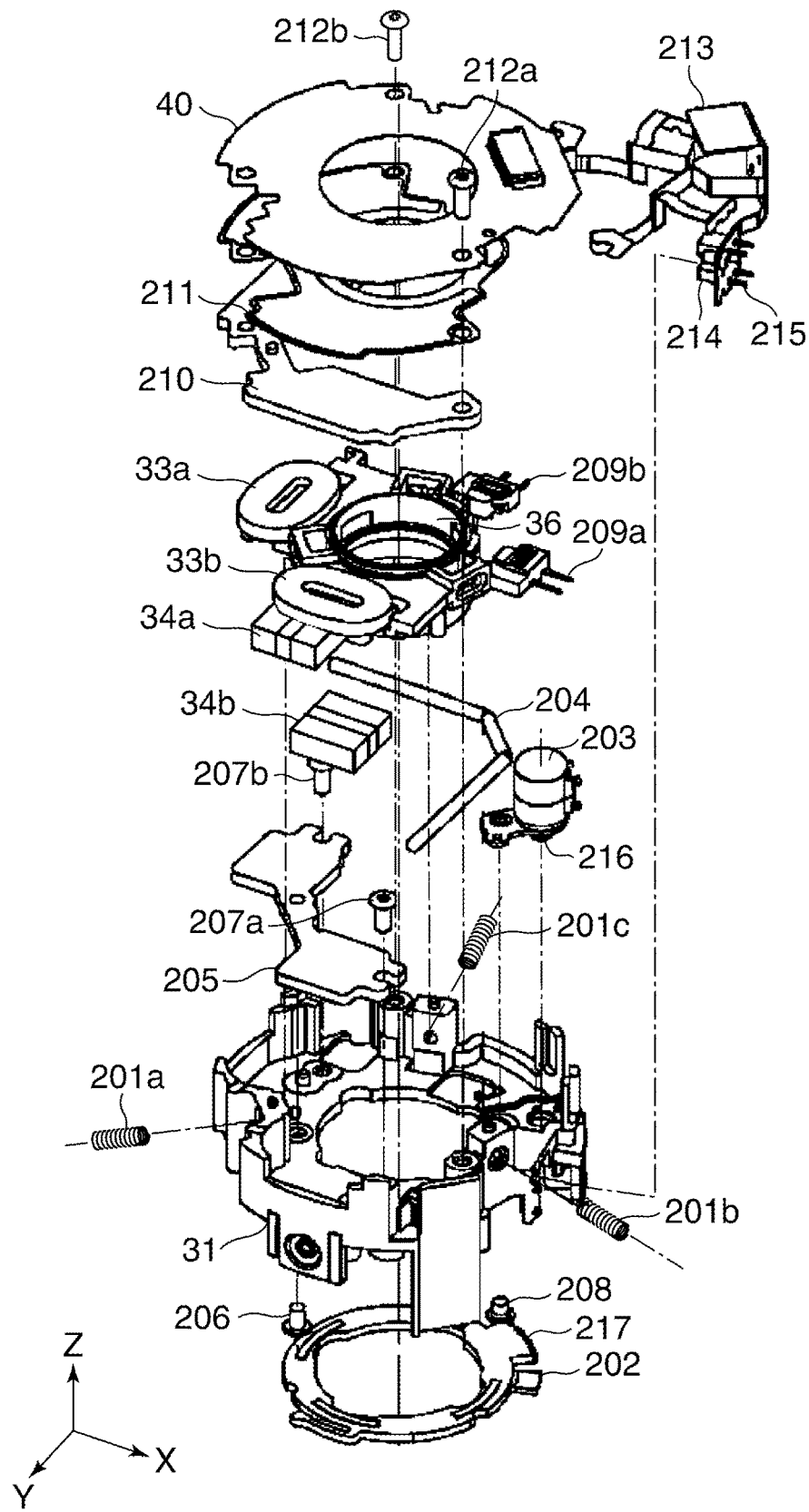
FIG. 6 is an exploded perspective view showing a part of a lens driving unit in FIG. 1 that functions as an antivibration device according to a second embodiment.

FIG. 6 is an exploded perspective view showing a part of a lens driving unit 13 that functions as an antivibration device according to the second embodiment.

In FIG. 6, the same reference number is assigned to the member that has the same function as the member of the lens driving unit 13 that functions as the antivibration device of the first embodiment shown in FIG. 2. The configuration shown in FIG. 6 is provided with sliding shafts 201a, 201b, and 201c, a lock ring 202, a lock-ring drive motor 203, an anti-rotation bar 204, a fixed yoke 205, a positioning pin 206, screws 207a, 207b, 208, 212a, 212b, and 214, LEDs 209a and 209b, an opposition yoke 210, a shading plate 211, a relay FPC 213, and a photointerrupter 215. Coils 33a and 33b, LEDs 209a and 209b are fixed to a movable frame 36 and move together with the movable frame 36. The relay FPC 213 is fixed to a stationary frame 31 with the screw 214. Electric power is supplied to the LEDs 209a and 209b, the photointerrupter 215, and the coils 33a and 33b through a resilient part of the relay FPC 213.

The sliding shafts 201a, 201b, and 201c are fit into fitting holes of the stationary frame 31 and slots of the movable frame 36 and are fixed to the stationary frame 31. The movable frame 36 is guided in a plane orthogonal to the optical axis by using the three sliding shafts and slots. The lock ring 202 is driven through a gear 216 attached to the lock-ring drive motor 203. The gear 216 meshes with a sector gear 217 provided on the lock ring, and the lock ring 202 rotates. This enables to switch contact and non-contact between the lock ring 202 and the movable frame 36. When the movable frame 36 is driven, the lock ring 202 and the movable frame 36 are brought into a non-contact state so that the movable frame 36 will be driven by the drive unit mentioned later. In the meantime, when the power is turned off, the lock ring 202 and the movable frame 36 are brought into a contact state, and the movement of the movable frame 36 is restricted to the stationary frame 31. The motion of the lock ring 202 is detectable by the photointerrupter 215. Furthermore, the anti-rotation bar 204 is formed in an approximately L shape and has a suitable contact point to the movable frame 36. This allows the translation within the plane orthogonal to the optical axis while restricting the rotation.

Next, the configuration of the magnetic circuit included in the moving coil actuator that functions as the drive unit of the antivibration device according to the second embodiment will be described.

The magnetic circuit of the second embodiment is formed by the coils 33a and 33b, the magnet assemblies 34a and 34b, the fixed yoke 205, and the opposition yoke 210, as shown in FIG. 6. As mention later with reference to FIG. 8A, each of the magnet assemblies 34a and 34b is formed from a plurality of magnets but is indicated by one symbol as a magnet unit that constitutes a magnetic circuit. The fixed yoke 205, opposition yoke 210, and magnet assemblies 34a and 34b are fixed to the stationary frame 31, and the coils 33a and 33b are fixed to the movable frame 36, so that what is called a moving coil actuator is constituted. Since the movable frame 36 is guided in the plane orthogonal to the optical axis, it moves in the plane. The movable frame 36 is movable to any position by what is called feedback control while detecting the position by a position sensor mentioned below.

Figure 8A:
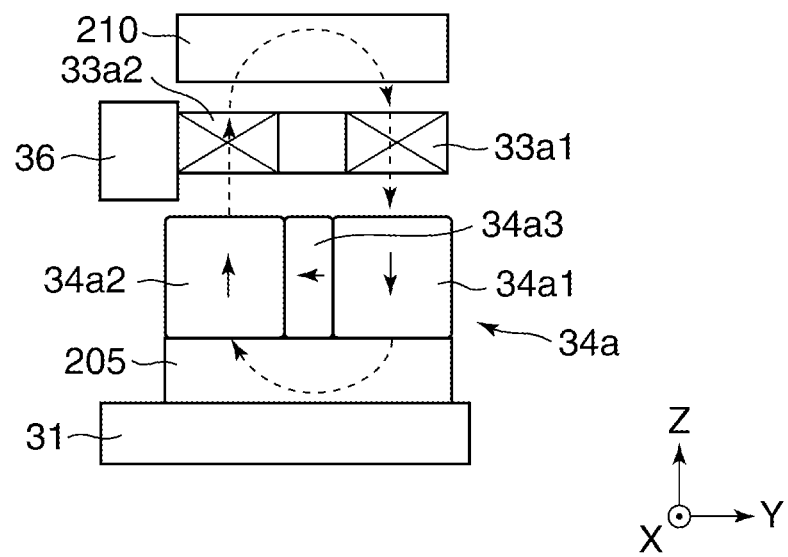
FIG. 8A and FIG. 8B are views for respectively describing the configurations of the magnetic circuits in FIG. 6 and FIG. 7.

A preferable arrangement of magnets (magnetization direction) in the magnetic circuit of the second embodiment will be described with reference to FIG. 8A. The magnetic circuit shown in FIG. 8A is shown as a sectional view similar to FIG. 3B. Moreover, in FIG. 8A, the same reference numerals are given to the elements that are identical to the elements in FIG. 3B. FIG. 8A shows the magnetic circuit including the magnet assembly 34a and the coil 33a in FIG. 6. The magnetic circuit including the magnet assembly 34b and the coil 33b in FIG. 6 has the same configuration except for the point that the X axis and the Y axis are exchanged.

The magnet assembly 34a shown in the exploded perspective view in FIG. 6 is constituted by three magnets including a first magnet 34a1, second magnet 34a2, and third magnet 34a3 that are aligned in a direction (Y direction in the second embodiment) that intersects perpendicularly with the optical axis (Z axis) as shown in FIG. 8A. The first magnet 34a1 has a magnetization direction in a direction parallel to the optical axis. The second magnet 34a2 has a magnetization direction that is in the direction parallel to the optical axis and is opposite to that of the first magnet 34a1. Furthermore, the third magnet 34a3 is provided between the first magnet 34a1 and the second magnet 34a2. The third magnet 34a3 has a magnetization direction in the direction that has a pole in the same direction of the poles of the first magnet and the second magnet when viewed from the coil 33a side. That is, the surface of the first magnet 34a1 that faces the coil 33a exhibits an N pole, and the surface of the second magnet 34a2 that faces the coil 33a exhibits an S pole. In the meantime, the surface of the third magnet 34a3 that contacts the first magnet 34a1 exhibits the N pole, and the surface of the third magnet 34a3 that contacts the second magnet 34a2 exhibits the S pole.

Moreover, the magnetic circuit of the second embodiment is so configured that the side spaces of the first and second magnets 34a1 and 34a2 that are opposite to the third magnet 34a3 are occupied by material of which magnetic permeability is lower than that of the first, second, and third magnets 34a1, 34a2, and 34a3. Specifically, the side spaces of the first and second magnets 34a1 and 34a2 that are opposite to the third magnet 34a3 are occupied by air.

As mentioned above, although the antivibration device of the second embodiment includes the moving coil actuator that is different from the moving magnet actuator that is included in the antivibration device of the first embodiment as shown in FIG. 2, the configurations of the magnetic circuits are common.

The two longitudinal parts 33a1 and 33a2 of the coil 33a approximately face the first and second magnets 34a1 and 34a2, respectively. Moreover, the fixed yoke 205 is arranged at the side of the first, second, and third magnets 34a1, 34a2, and 34a3 that is opposite to the side facing the coil 33a as shown in FIG. 8A. Furthermore, the opposition yoke 210 is arranged at the side of the coil 33a opposite to the magnet 34a. The fixed yoke 205 and the opposition yoke 210 are made from material whose magnetic permeability is higher than a vacuum and are preferably made from soft magnetic material. This allows transmission of much magnetic flux and improves the efficiency of the magnetic circuit.

Since the fixed yoke 205 and the opposition yoke 210 are fixed to the stationary frame 31, the thickness is suitably decided so that the magnetic flux may not be saturated without taking weight into consideration. When electric current is applied to the coil 33a in this state, the electric current flows through the longitudinal parts 33a1 and 33a2 in the opposite directions orthogonal to the sheet of FIG. 8A. For example, when the electric current flows through the one longitudinal part 33a1 of the coil 33a in the front-to-back direction orthogonal to the sheet, the electric current flows through the other longitudinal part 33a2 of the coil 33 in the back-to-front direction orthogonal to the sheet. Thereby, driving force occurs by the Fleming's left-hand rule.

Hereinafter, the position sensor of the antivibration device according to the second embodiment will be described. The position sensor is constituted by the LEDs 209a and 209b that are fixed to the movable frame 36 and the PSDs (not shown) that are fixed to the stationary frame 31 at the positions opposite to the LEDs, respectively. Electric power is supplied to the LEDs 209a and 209b through the relay FPC 213 during the image stabilization so as to emit light. Similarly, electric power is supplied to the PSDs (not shown) during the image stabilization. When the movable frame 36 moves relatively to the stationary frame 31, the light amount distribution on the PSD varies. The position of the movable frame 36 is detected on the basis of the variation. The lens is moved to a target position by the feedback control based on the signal from the PSD, which enables the image stabilization. In addition, the magnetometric sensors 51a and 51b may be provided inside the coils 33a and 33b as with the first embodiment also in the second embodiment instead of providing the LEDs 209a and 209b and the PSDs. Moreover, although the second embodiment employs the LEDs 209a and 209b, light sources are not limited to the LEDs as long as they can be used for the image stabilization.

Next, the sizes of the fixed yoke 205 and the opposition yoke 210 in the driving force generation direction (X sizes in the second embodiment) will be considered. One characteristic feature of the magnetic circuit of the second embodiment is that the side spaces of the first and second magnets 34a1 and 34a2 that are opposite to the third magnet 34a3 are occupied by material of which magnetic permeability is lower than that of the magnets. This prevents the magnetic flux from leaking to the side spaces of the magnetic circuit. In order to obtain the better effect, it is preferable that the magnetic flux from the first magnet 34a1 and the second magnet 34a2 does not go in the direction that is not directed to the third magnet 34a3. For that purpose, each of the sizes of the fixed yoke 205 and the opposition yoke 210 in the driving force generation direction is preferably equal to the total of the sizes of the first, second, and third magnets 34a1, 34a2, and 34a3 in the driving force generation direction. This reduces leakage of the magnetic flux and improves the efficiency of the magnetic circuit.

The sizes of the fixed yoke 205 and the opposition yoke 210 in the thickness direction will be considered. As mentioned in the description about FIG. 3B, since the poles that mutually attract are adjacent, the magnetic field lines that are appeared from the first magnet 34a1 and the second magnet 34a2 at the side of the magnet attraction plate 37 are immediately absorbed by the third magnet 34a3. That is, the fixed yoke 205 side shown in FIG. 8A of the magnetic circuit of the second embodiment is configured to be similar to a closed magnetic circuit. Accordingly, each of the sizes of the first, second, and third magnets 34a1, 34a2, and 34a3 in the direction toward the coil 33a (i.e., the thickness direction) is larger than that of the fixed yoke 205 and the opposition yoke 210 that are made from material whose magnetic permeability is higher than a vacuum.

Hereinafter, an antivibration device according to a third embodiment will be described with reference to FIG. 7.

Figure 7:
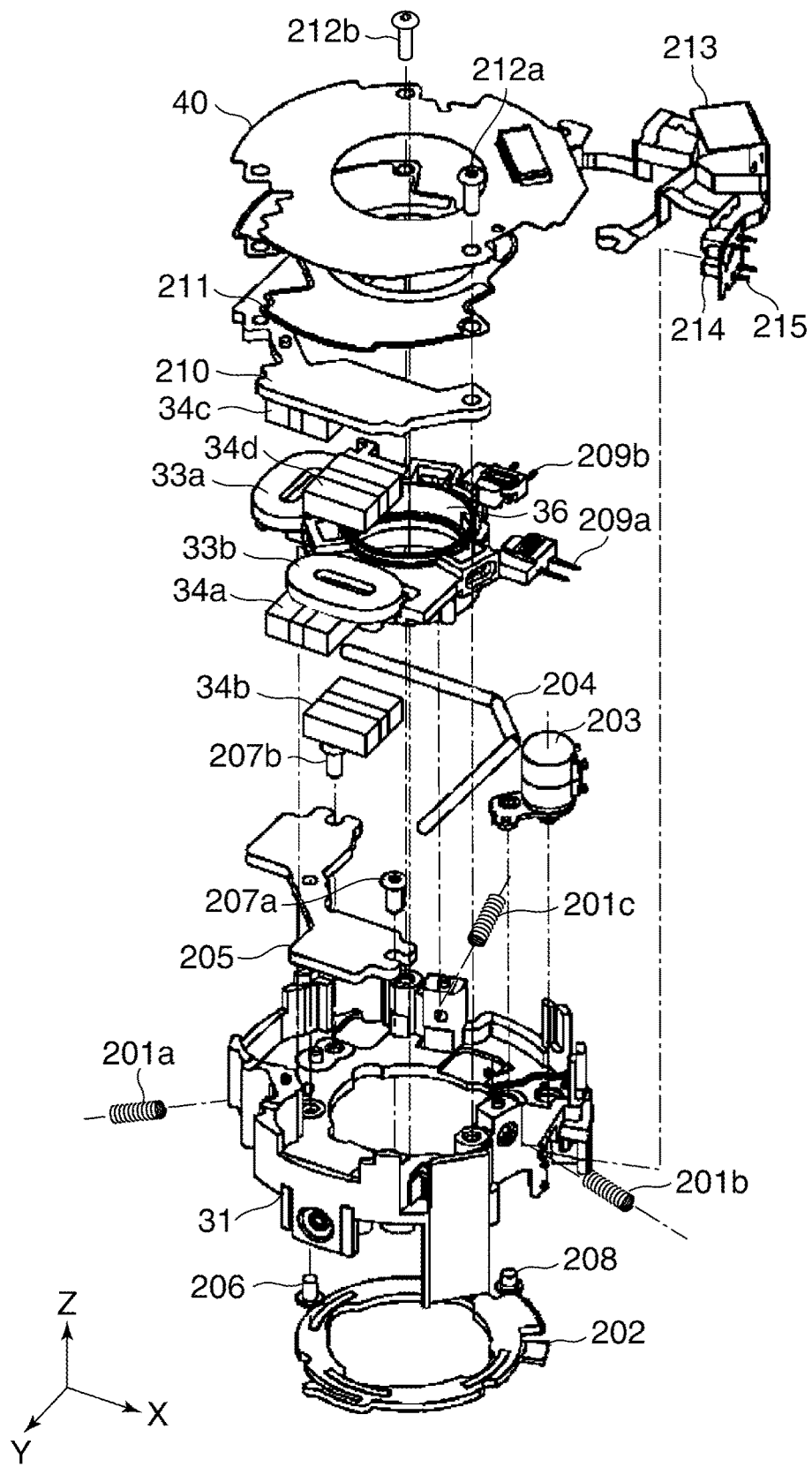
FIG. 7 is an exploded perspective view showing a part of a lens driving unit in FIG. 1 that functions as an antivibration device according to a third embodiment.

FIG. 7 is different from that in FIG. 6 at the configuration of the magnetic circuit and the others are common. Accordingly, only the difference from FIG. 6 will be described about FIG. 7.

FIG. 7 is an exploded perspective view showing a part of a lens driving unit 13 that functions as an antivibration device according to the third embodiment.

Although the schematic configuration of the antivibration device shown in FIG. 7 is similar to that shown in FIG. 6, a magnet assembly 34c is arranged at a position opposite to the magnet assembly 34a across the coil 33a, and a magnet assembly 34d is arranged at a position opposite to the magnet assembly 34b across the coil 33b. This improves the magnetic flux density more.

Figure 8B:
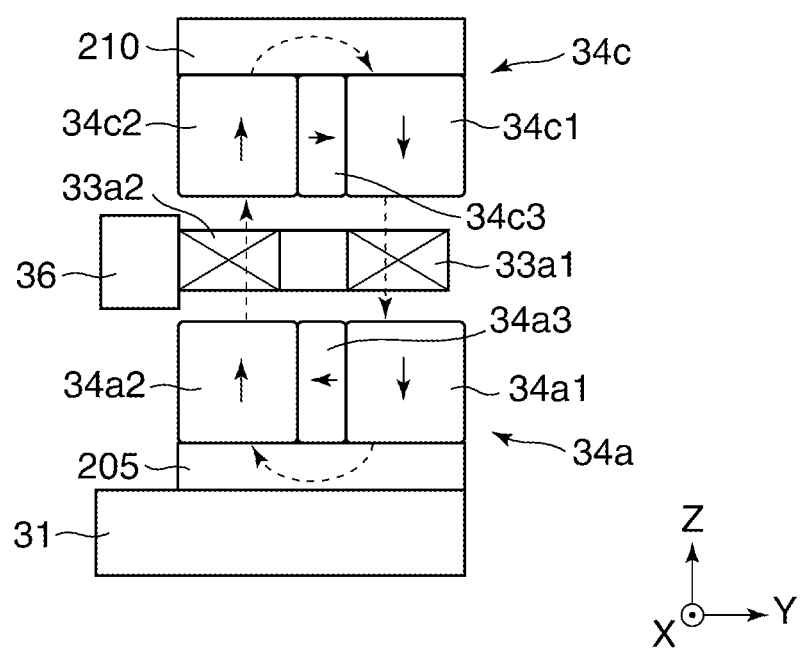

A preferable arrangement of magnets (magnetization direction) in the magnetic circuit of the third embodiment will be described with reference to FIG. 8B. FIG. 8B shows the magnetic circuit including the magnet assemblies 34a and 34c and the coil 33a in FIG. 7. The magnetic circuit including the magnet assemblies 34b and 34d and the coil 33b in FIG. 7 has the same configuration except for the point that the X axis and the Y axis are exchanged.

The magnet assembly 34a shown in the exploded perspective view in FIG. 7 is constituted by three magnets including a first magnet 34a1, second magnet 34a2, and third magnet 34a3 that are aligned in a direction (Y direction in the third embodiment) that intersects perpendicularly with the optical axis (Z axis) as shown in FIG. 8B. The first magnet 34a1 has a magnetization direction in a direction parallel to the optical axis. The second magnet 34a2 has a magnetization direction that is in the direction parallel to the optical axis and is opposite to that of the first magnet 34a1. Furthermore, the third magnet 34a3 is provided between the first magnet 34a1 and the second magnet 34a2. The third magnet 34a3 has a magnetization direction in the direction that has a pole in the same direction of the poles of the first magnet and the second magnet when viewed from the coil 33a side. That is, the surface of the first magnet 34a1 that faces the coil 33a exhibits an S pole, and the surface of the second magnet 34a2 that faces the coil 33a exhibits an N pole. In the meantime, the surface of the third magnet 34a3 that contacts the first magnet 34a1 exhibits the S pole, and the surface of the third magnet 34a3 that contacts the second magnet 34a2 exhibits the N pole.

Moreover, the magnet assembly 34c shown in FIG. 7 is constituted by three magnets including a fourth magnet 34c1, fifth magnet 34c2, and sixth magnet 34c3 that are aligned in a direction (Y direction in the third embodiment) that intersects perpendicularly with the optical axis (Z axis) as shown in FIG. 8B. The fourth magnet 34c1 is arranged at a position opposite to the first magnet 34a1 across the coil 33a and has a magnetization direction in the same direction as the first magnet 34a1. The fifth magnet 34c2 is arranged at a position opposite to the second magnet 34a2 across the coil 33a and has a magnetization direction in the same direction as the second magnet 34a2. Furthermore, the sixth magnet 34c3 is provided between the fourth and fifth magnets 34c1 and 34c2 and has a magnetization direction in the direction that has a pole in the same direction of the poles of the fourth and fifth magnets 34c1 and 34c2 when viewed from the coil 33a side. That is, the surface of the fourth magnet 34c1 that faces the coil 33a exhibits an N pole, and the surface of the fifth magnet 34c2 that faces the coil 33a exhibits an S pole. In the meantime, the surface of the sixth magnet 34c3 that contacts the fourth magnet 34c1 exhibits the N pole, and the surface of the sixth magnet 34c3 that contacts the fifth magnet 34c2 exhibits the S pole.

Moreover, the magnetic circuit is so configured that the side spaces of the fourth and fifth magnets 34c1 and 34c2 that are opposite to the sixth magnet 34c3 are occupied by material of which magnetic permeability is lower than that of the fourth, fifth, and sixth magnets 34c1, 34c2, and 34c3. Specifically, the side spaces of the fourth and fifth magnets 34c1 and 34c2 that are opposite to the sixth magnet 34c3 are occupied by air.

The two longitudinal parts 33a1 and 33a2 of the coil 33a are respectively arranged at a position between the first magnet 34a1 and the fourth magnet 34c1 and a position between the second magnet 34a2 and the fifth magnet 34c2. Moreover, a fixed yoke 205 is arranged at the side of the first, second, and third magnets 34a1, 34a2, and 34a3 that is opposite to the side facing the coil 33a as shown in FIG. 8B. An opposition yoke 210 is arranged at the side of the fourth, fifth, and sixth magnets 34c1, 34c2, and 34c3 that is opposite to the side facing the coil 33a. The fixed yoke 205 and the opposition yoke 210 are preferably made from soft magnetic material. This allows transmission of much magnetic flux and improves the efficiency of the magnetic circuit.

Since the fixed yoke 205 and the opposition yoke 210 are fixed to the stationary frame 31, the thickness is suitably decided so that the magnetic flux may not be saturated without taking weight into consideration. When electric current is applied to the coil 33a in this state, the electric current flows through the longitudinal parts 33a1 and 33a2 in the opposite directions orthogonal to the sheet of FIG. 8B. For example, when the electric current flows through the one longitudinal part 33a1 of the coil 33a in the front-to-back direction orthogonal to the sheet, the electric current flows through the other longitudinal part 33a2 of the coil 33 in the back-to-front direction orthogonal to the sheet. Thereby, driving force occurs by the Fleming's left-hand rule.

As described above, the first, second, and third embodiments reduce leakage flux and improve the efficiency of the magnetic circuit. As a result, an antivibration device saves power consumption and is downsized.

Hereinafter, a stage apparatus according to a fourth embodiment of the present invention and an image pickup apparatus equipped with the stage apparatus will be described with reference to FIG. 9 through FIG. 17.

Figure 9:
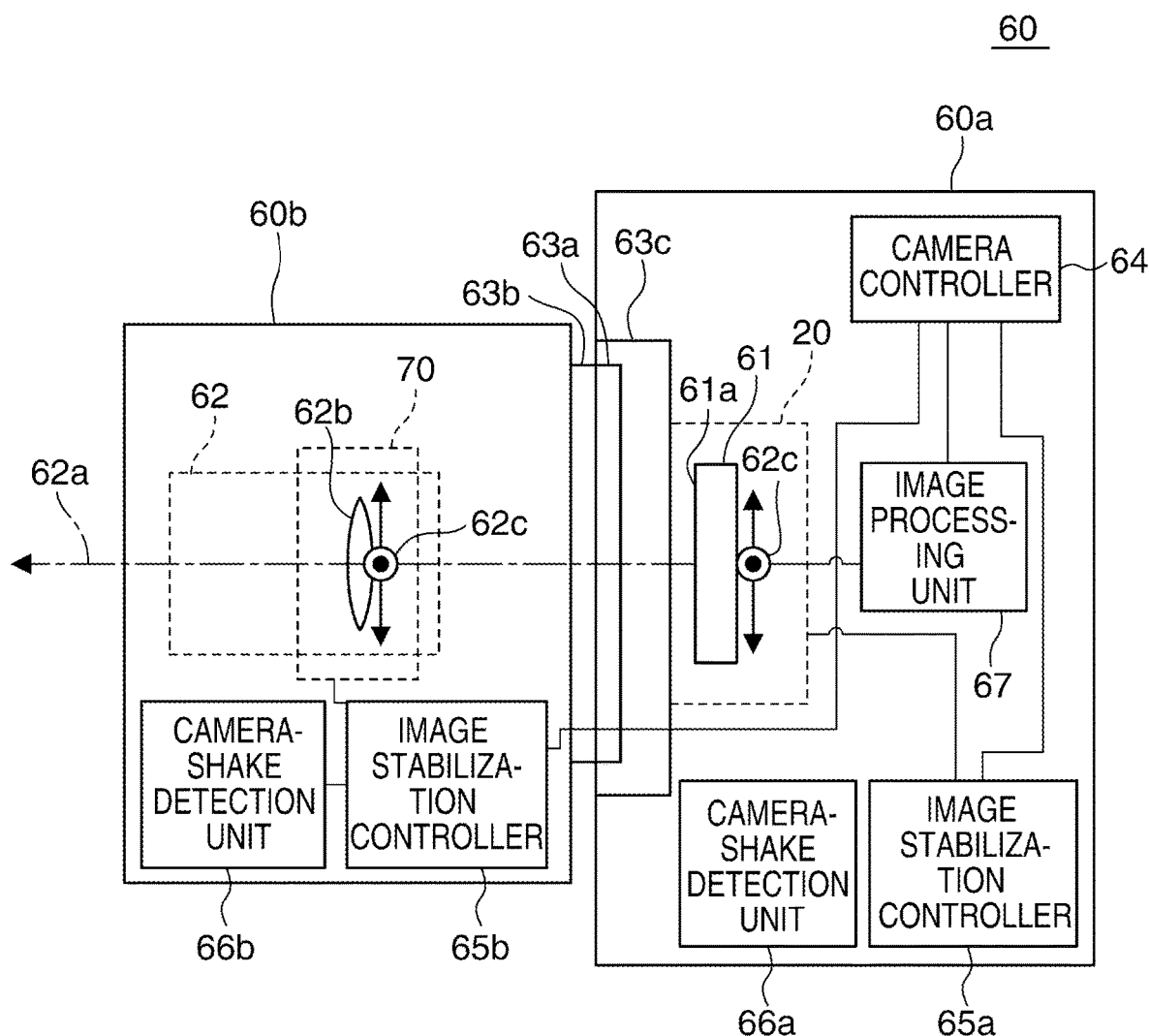
FIG. 9 is a block diagram of a camera as an image pickup apparatus according to a fourth embodiment of the present invention.

FIG. 9 is a block diagram of a camera 60 as the image pickup apparatus according to the fourth embodiment of the present invention.

As shown in FIG. 9, a camera system (hereinafter referred to as a camera, simply) 60 as the image pickup apparatus according to the fourth embodiment is provided with a camera body (or referred to as a body, simply) 60a, and an interchangeable lens (or referred to as a lens, simply) 60b.

The body 60a provides an image pickup device 61 having an image pickup surface 61a at an object side, a frame 63c, a camera controller 64, and an image processing unit 67.

The lens 60b includes an image pickup optical system 62 that has an image stabilization lens 62b. The image pickup surface 61a on which an object image is formed through the image pickup optical system 62 is parallel to an optical-axis orthogonal plane 62c that intersects perpendicularly with an image pickup optical axis (hereinafter referred to as an optical axis, simply) 62a. Moreover, the reference numeral 62a is also used about the optical axis direction for convenience in the following description. The optical axis direction 62a is a direction that goes toward the object (not shown).

Furthermore, the body 60a and the lens 60b are respectively provided with mounts 63a and 63b, image stabilization controllers 65a and 65b, camera-shake detection units 66a and 66b, and first and second image stabilization mechanisms 20 and 70 equivalent to the stage apparatus of the fourth embodiment.

The image pickup device 61 is constituted by a CMOS image sensor or a CCD image sensor and is arranged so that the image pickup surface 61a is directed to the object (not shown) within the body 60a and intersects perpendicularly with the optical axis 62a. The image pickup device 61 plays a role that generates an image signal by photoelectrically converting an object image formed by the image pickup optical system 62 mentioned later on the image pickup surface 61a. The image processing unit 67 applies various processes to the image signal generated by the image pickup device 61 so as to generate image data. The image data is saved in a memory unit (not shown).

The image pickup optical system 62 is constituted by lens groups (not shown) in the lens 60b and plays a role that forms an object image on the image pickup surface 61a of the image pickup device 61. The image pickup optical system 62 includes the image stabilization lens 62b mentioned later.

In order to arrange the image pickup device 61 correctly with respect to the optical axis 62a of the image pickup optical system 62 in the lens 60b, both the lens 60b and the image pickup device 61 are connected with the frame 63c in the body 60a. In this case, the image pickup device 61 is connected with the frame 63c through the first image stabilization mechanism 20 mentioned later. Moreover, the lens 60b is connected with the frame 63c through the mount 63b of the lens 60b and the mount 63a of the body 60a.

The camera controller 64 is a calculation unit in a main IC (not shown) and plays a role that controls various image pickup actions, user's input operations, and display operations, etc. in the camera 60. In the following description in the fourth embodiment, the camera controller 64 shall control actions by the other various controllers and detecting actions by detectors.

In the camera 60, the image pickup device 61 and the image stabilization lens 62b are image stabilization elements of the present invention, and an image stabilization is performed by translation or rotation of the elements within the optical-axis orthogonal plane 62c. More specifically, when the posture of the camera 60 varies to an object (not shown) during image pickup operation (i.e., when a camera shake occurs), the object image on the image pickup surface 61a of the image pickup device 61 moves, which causes an image blur. When the posture change is small enough, the movement of the image on the image pickup surface 61a is uniform and is considered as translation or rotation (image plane blur) within the optical-axis orthogonal plane 62c. Accordingly, when the image pickup device 61 transfers or rotates within the optical-axis orthogonal plane 62c so as to counteract the image plane blur, the image is stabilized (image blur is compensated). Moreover, the image stabilization lens 62b is able to refract the optical axis 62a by translational movement within the optical-axis orthogonal plane 62c. Accordingly, when the image stabilization lens 62b transfers within the optical-axis orthogonal plane 62c so as to counteract the image plane blur, the image is stabilized (image blur is compensated). Since the principle and control of the image stabilization are well known and are not the principal part of the present invention, a more detailed description is omitted.

The image pickup device 61 and image stabilization lens 62b, which are the image stabilization elements, are respectively held and controlled by the first and the second image stabilization mechanisms 20 and 70, which are the stage apparatuses according to the fourth embodiment of the present invention, so as to be movable within certain ranges in the optical-axis orthogonal planes 62c on the optical axis 62a. In general, when the movable range becomes wider, the larger image plane blur can be compensated and the image stabilization becomes possible in more photographing scenes. However, since the wide movable range enlarges the body 60a and lens 60b, the movable range is set to a suitable, necessary amount.

The first image stabilization mechanism 20 has a stationary part, a movable part, and a plurality of driving force generation units, which will be described below in detail and are not shown in FIG. 9. The stationary part supports the movable part so as to enable translation and rotation within the optical-axis orthogonal plane relative to the stationary part. The stationary part is fixed to the frame 63c, and the movable part holds the image pickup device 61. This enables translation and rotation of the image pickup device 61 within the optical-axis orthogonal plane 62c. That is, the first image stabilization mechanism 20 constitutes a plane stage apparatus (what is called a XYθ stage) that enables triaxial drive control.

The second image stabilization mechanism 70 has a stationary part, a movable part, and a plurality of driving force generation units, which are not shown in FIG. 9 as with the first image stabilization mechanism 20. The stationary part supports the movable part so as to enable translation within the optical-axis orthogonal plane relative to the stationary part. The stationary part is fixed to the frame 63c through a housing of the lens 60b and the mounts 63a and 63b, and translation of the image stabilization lens 62b is enabled within the optical-axis orthogonal plane 62c because a movable part holds the image stabilization lens 62b. That is, the second image stabilization mechanism 70 constitutes a plane stage apparatus (what is called an XY stage) that enables biaxial drive control.

In the following description about the fourth embodiment, a detailed configuration of the first image stabilization mechanism 20 will be illustrated and described as a representative of the stage apparatuses according to the present invention. Since the principal part of the fourth embodiment is the configuration of the driving force generation unit, the configuration of the fourth embodiment is applicable also to the second image stabilization mechanism 70.

The image stabilization controllers 65a and 65b in the body 60a and lens 60b play roles of image stabilizers that control motions of the image pickup device 61 and image stabilization lens 62b by drivingly controlling the first and second image stabilization mechanisms 20 and 70, respectively. The movement target values for the image pickup device 61 and the image stabilization lens 62b are calculated on the basis of the shake information about the camera 60. The shake information is obtained from the camera-shake detection unit 66a in the body 60a and the camera-shake detection unit 66b in the lens 60b.

The camera-shake detection units 66a and 66b detect information about angle variation amounts and moving amounts of the camera 60 in each direction. For example, these units are constituted by gyro sensors and acceleration sensors, etc., and detect angular velocities and accelerations of the camera 60 in each direction. Accordingly, the image stabilization controller 65a in the body 60a and the image stabilization controller 65b in the lens 60b are able to calculate the angle variation amounts and moving amounts of the camera 60 in each direction as the shake information by integrating the angular velocities and accelerations. This enables to calculate the movement target values for the image pickup device 61 and image stabilization lens 62b and to control the drives of the first image stabilization mechanism 20 and second image stabilization mechanism 70.

It should be noted that the body 60a and the interchangeable lens 60b are mutually connected through the frame 63c, the mount 63a of the body 60a, and the mount 63b of the lens 60b as mentioned above. Accordingly, the camera-shake detection unit 66a in the body 60a and the camera-shake detection unit 66b in the lens 60b detect the angular velocity and acceleration of the same camera 60 basically. Accordingly, the camera 60 may be so configured that one of the camera-shake detection units 66a and 66b is provided and its detection result is shared by both the body 60a and lens 60b to perform image stabilization by the image stabilization controllers 65a and 65b. In the meantime, the detection result of the camera-shake detection unit 66a in the body 60a may differ from the detection result of the camera-shake detection unit 66b in the lens 60b because of difference in performance due to difference in manufacture period, or difference in rigidity or ease of receiving a shake between the installed positions. Accordingly, it is preferable to calculate the shake information about the camera 60 by combining appropriately the detection results of these camera-shake detection units 66a and 66b corresponding to various kinds of photographing settings or the state of the camera 60. Since the details of the combining method are well known and are not the principal part of the present invention, their descriptions are omitted.

Moreover, as mentioned above, the image stabilization of the camera 60 is performed by two means including the movement controls of the image pickup device 61 by the first image stabilization mechanism 20 and the movement controls of the image stabilization lens 62b by the second image stabilization mechanism 70. Accordingly, the camera 60a may have only one of the first and second image stabilization mechanisms 20 and 70. In such a case, the element (namely, the image pickup device 61 or the image stabilization lens 62b) of the side that does not have an image stabilization mechanism among the body 60a and the lens 60b is arranged so as to be fixed to the optical axis 62a. In the meantime, since the image pickup device 61 and the image stabilization lens 62b are the image stabilization elements that have respective features, it is preferable to perform the image stabilization of the camera 60 by combining these elements appropriately. Since the feature of the image stabilization element and the details of the combining method are well known and are not the principal part of the present invention, their descriptions are omitted.

Next, the detailed configuration of the first image stabilization mechanism (hereinafter referred to as the image stabilization mechanism, simply) 20 will be described.

Figure 10:
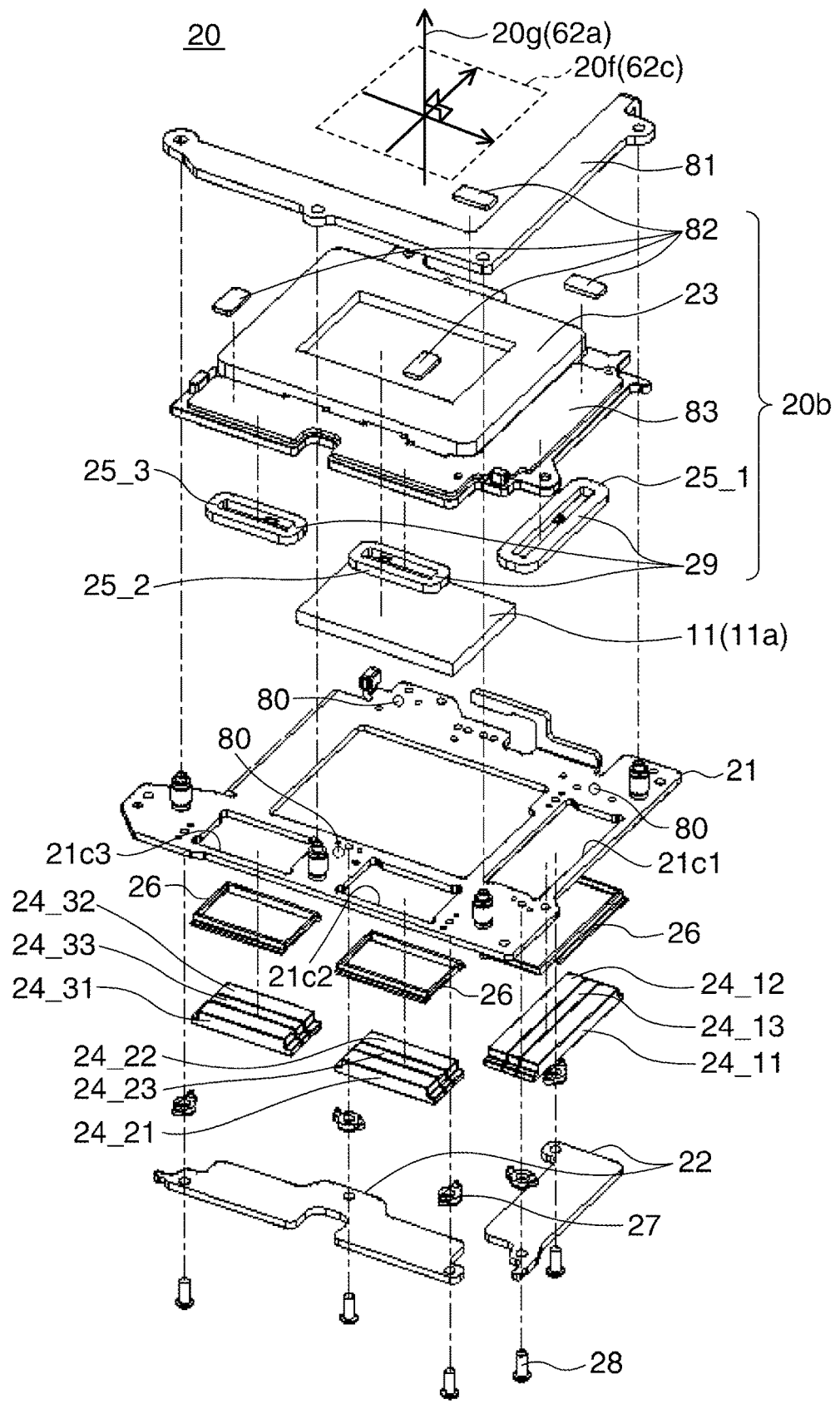
FIG. 10 is an exploded perspective view showing an image stabilization mechanism as a stage apparatus according to the fourth embodiment of the present invention.
Figure 11A:
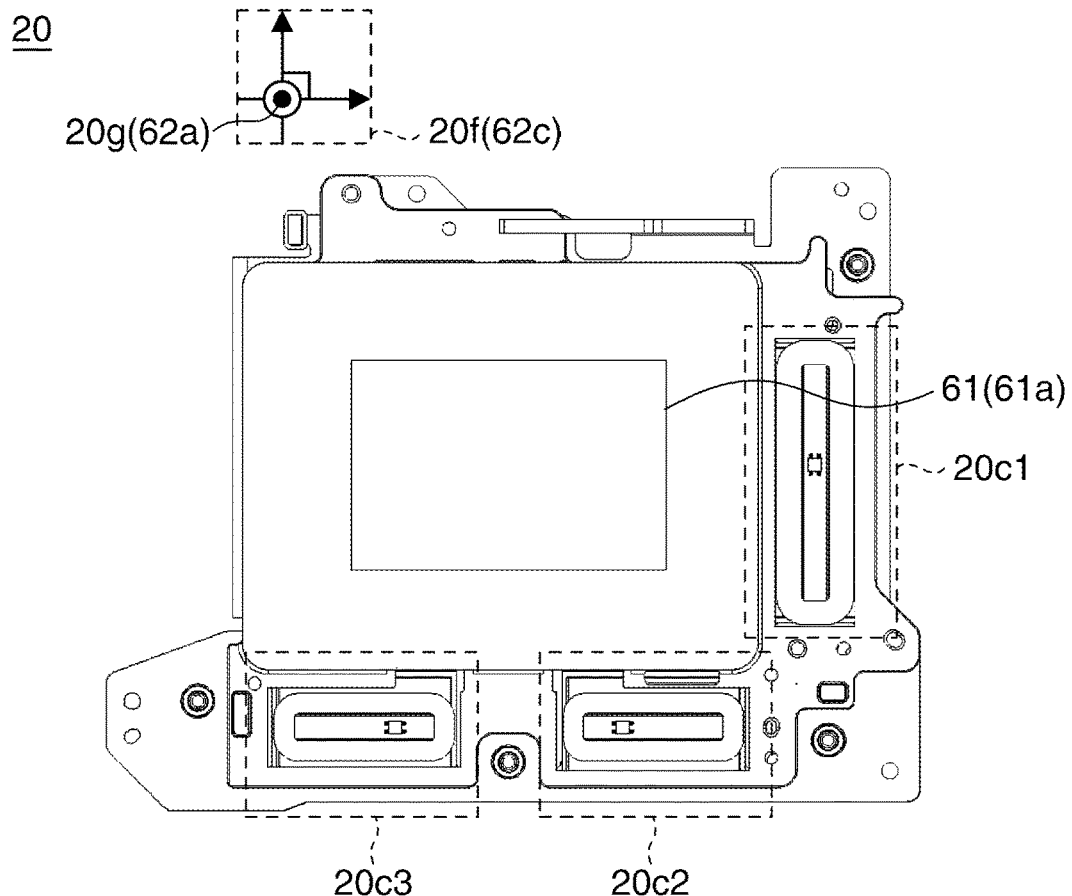
FIG. 11A and FIG. 11B are a front view and an exploded side view showing the image stabilization mechanism in FIG. 10.
Figure 11B:
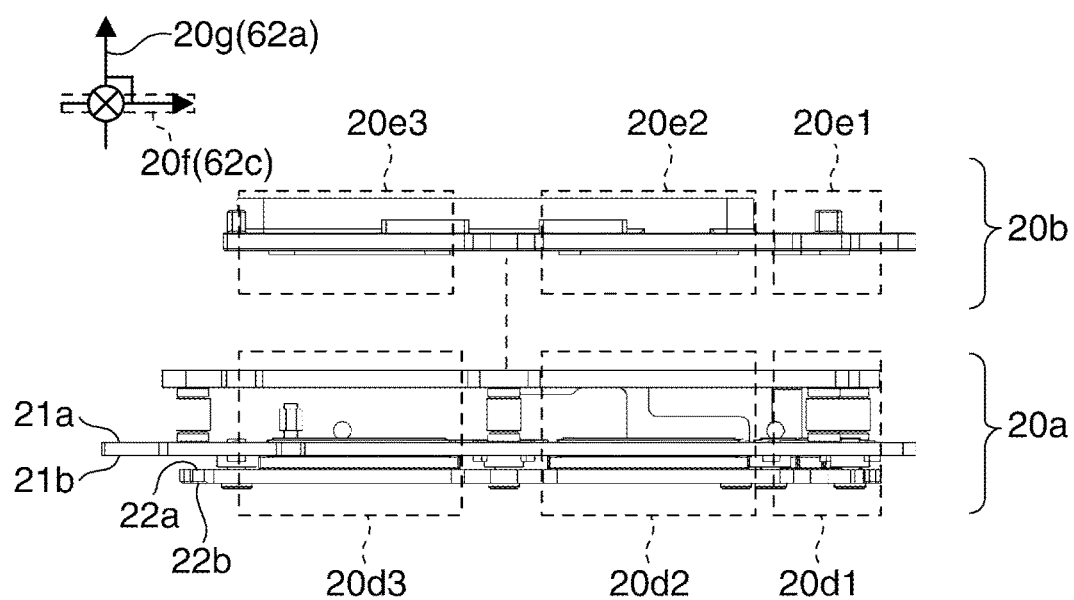
Figure 12:
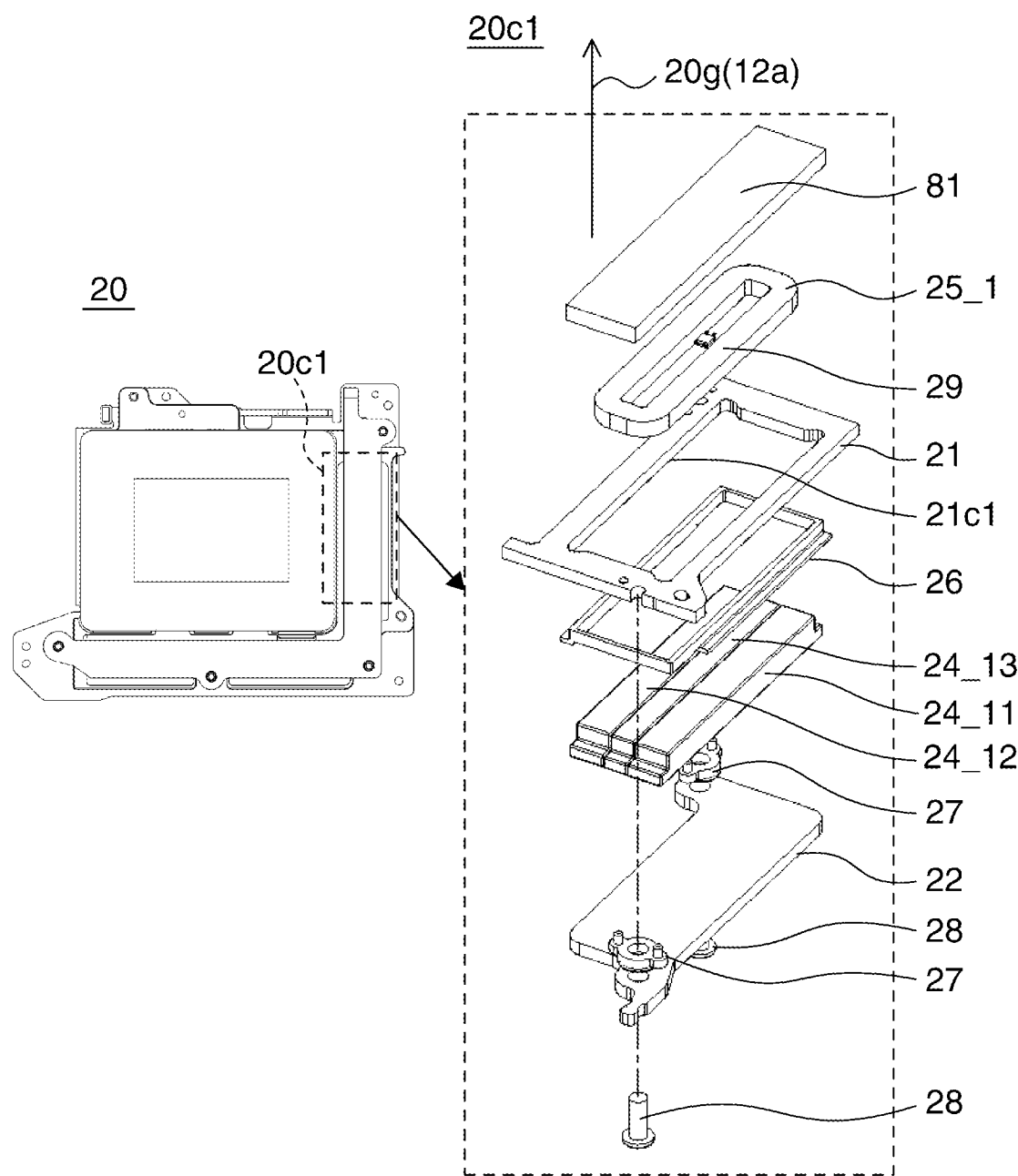
FIG. 12 is an exploded perspective view showing a first driving force generation unit of the image stabilization mechanism in FIG. 10.

FIG. 10 is an exploded perspective view showing the image stabilization mechanism 20 as the stage apparatus according to the fourth embodiment of the present invention. Moreover, FIG. 11A and FIG. 11B are a front view and an exploded side view showing the image stabilization mechanism 20 in FIG. 10. Moreover, FIG. 12 is an exploded perspective view showing a first driving force generation unit 20c1 of the image stabilization mechanism 20 in FIG. 10. In the drawings, only the main parts that constitute the image stabilization mechanism 20 are illustrated, and illustrations of the other parts are omitted. Moreover, some parts shown in FIG. 10 are not shown in the front view of FIG. 11A.

As shown in FIG. 10 through FIG. 12, the image stabilization mechanism 20 is provided with a stationary part 20a and a movable part 20b.

Moreover, parts of the stationary part 20a and movable part 20b constitute first, second, and third driving force generation units 20c1, 20c2, and 20c3. Hereinafter, these are generally defined as driving force generation units. Specifically, the first, second, and third driving force generation units 20c1, 20c2, and 20c3 have first, second, and third magnetic circuits 20d1, 20d2, and 20d3 as parts of the side of the stationary part 20a and have first, second, and third coil units 20e1, 20e2, and 20e3 as parts of the side of the movable part 20b, respectively. These are generally defined as magnetic circuits and coil units, respectively.

Moreover, the first, second, and third driving force generation units 20c1, 20c2, and 20c3 respectively have first, second, and third magnets 24_11, 24_12, and 24_13, 24_21, 24_22, and 24_23, and 2431, 24_32, and 24_33. Hereinafter, these are generally defined as magnets 24. For example, the second driving force generation unit 20c2 has the third magnet 24_23.

The first, second, and third driving force generation units 20c1, 20c2, and 20c3 have first, second, and third coils 25_1, 25_2, and 25_3, respectively. Hereinafter, these are generally defined as coils 25.

Furthermore, the stationary part 20a has a first stationary frame 21 and a second stationary frame 22 that consists of at least one members, and the movable part 20b has a movable frame 23.

Moreover, the stationary part 20a is provided with resin-made magnet holders 26 as shock absorbers, resin-made compression spacers 27 as compression members, screws 28 as locking members, balls 80, and a third stationary frame 81. In the meantime, the movable part 20b has magnetic field detecting elements 29 as position detection elements and steel sheets 82 as attracted members.

A drive plane 20f within which the movable part 20b translates and rotates with respect to the stationary part 20a and a drive-plane orthogonal direction 20g that intersects perpendicularly with the drive plane 20f are shown in FIG. 10 through FIG. 12. As mentioned above, the image stabilization mechanism 20 in the camera 60 is constituted so that the drive plane 20f and the drive-plane orthogonal direction 20g are respectively parallel to the optical-axis orthogonal plane 62c and the optical axis direction 62a.

Members of the image stabilization mechanism 20 are arranged in order of the third stationary frame 81, the steel sheets 82, an FPC 83, the movable frame 23, the coils 25, the balls 80, the first stationary frame 21, the magnet holders 26, the magnets 24, the second stationary frame 22, and the screws 28 in the drive-plane orthogonal direction 20g from the side of an object (not shown). Moreover, the magnetic field detecting elements 29 are arranged at axial centers of the coils 25 that are air-core coils, and the compression spacers 27 are nipped by the first and the second stationary frames 21 and 22 together with the magnets 24.

The steel sheets 82, FPC 83, coils 25, and magnetic field detecting elements 29 are fixed to the movable frame 23 so as to constitute a part of the movable part 20b. The third stationary frame 81, magnets 24, magnet holders 26, compression spacers 27, second stationary frame 22, and screws 28 are fixed to the first stationary frame 21 so as to constitute a part of the stationary part 20a. Furthermore, the image pickup device 61 is fixed to the movable frame 23 at a position where the image pickup surface 61a becomes parallel to the drive plane 20f.

Furthermore, the movable frame 23 is supported by the balls 80 on the first stationary frame 21 in the optical axis direction 62a, and the steel sheets 82 as the attracted members of the present invention on the movable frame 23 are attracted by the magnets 24. Accordingly, the image stabilization mechanism 20 allows the movable part 20b to translate and rotate within the drive plane 20f with respect to the stationary part 20a while fixing in the drive-plane orthogonal direction 20g. Furthermore, as mentioned above, the drive plane 20f and the drive-plane orthogonal direction 20g are respectively parallel to the optical-axis orthogonal plane 62c and the optical axis direction 62a. Accordingly, the image stabilization mechanism 20 performs the image stabilization of the camera 60 by translating and rotating the image pickup surface 61a of the image pickup device 61 within the optical-axis orthogonal plane 62c.

The first and second stationary frames 21 and 22 in the fourth embodiment 4 are plate members that spread in approximately parallel to the drive plane 20f. Hereafter, their main flat parts are defined as shown in FIG. 11B. Specifically, first surfaces 21a and 22a and second surfaces 21b and 22b are defined in order from the side near the movable frame 23 in the drive-plane orthogonal direction 20g. Moreover, the first stationary frame 21 provides openings at position corresponding to the driving force generation units. They are defined as first, second, and third openings 21c1, 21c2, and 21c3 as shown in FIG. 10.

The image stabilization mechanism 20 (and the second image stabilization mechanism 70 (not shown)) of the fourth embodiment is provided with the configuration called a voice coil motor (VCM) method as a configuration of a driving force generation unit. With this configuration, a magnet is arranged on one of the stationary part 20a and movable part 20b and a coil is arranged on the other, and driving force is generated by applying an electric current to the coil in a magnetic circuit formed by the magnet. Furthermore, the fourth embodiment employs the moving coil system in which the magnets 24 are arranged on the stationary part 20a and the coils 25 are arranged on the movable part 20b. Generally, since weight of coils is less than weight of magnets in a driving force generation unit with the VCM method, a moving coil system has an advantage to improve efficiency and response. However, the configuration of the present invention may be applied to a moving magnet system that inverts the arrangement of the moving coil system.

In order to improve the efficiency of the image stabilization mechanism 20 with the VCM method, the coils 25 are arranged as close as possible to the magnets in the drive-plane orthogonal direction 20g. Furthermore, the second and third stationary frames 22 and 81 are made of sheet metal material whose magnetic permeability is higher than that of the first stationary frame 21 that is made of an electromagnetic plate or a steel plate. The frames 22 and 81 play a role for preventing leakage of magnetic flux of the magnets 24 to the circumference as yokes. Moreover, since the first stationary frame 21 fixes the magnets 24, the third stationary frame 81, and the second stationary frame 22 as a main skeleton and plays a role for supporting the movable frame 23 through the balls 80, it is preferable to make the first stationary frame 21 from sheet metal material whose Young's modulus and surface hardness are higher than that of the second stationary frame 22. Furthermore, the first stationary frame 21 is preferably made from material of low magnetic permeability in order not to affect the magnetic circuit that consists of the magnets 24 and the second and third stationary frames 22 and 81 that are yokes. Accordingly, the first stationary frame 21 is preferably made of a stainless steel plate or material that combines a stainless steel plate with engineering plastic.

In the fourth embodiment, the magnetic circuits 20d in the driving force generation unit of the image stabilization mechanism 20 are formed by using the concept of the Hulbach array (hereinafter referred to as a Hulbach magnetic circuit for convenience). Accordingly, the magnets 24 of the magnetic circuits 20d are arranged in magnetization directions shown in FIG. 14A through FIG. 14E mentioned later. This heightens a driving-force generation efficiency and improves linearity of a magnetic circuit (i.e., heightens position detection accuracy) in comparison with a configuration of a general magnetic circuit. Next, a characteristic feature of the Hulbach magnetic circuit will be described. FIG. 12 shows the first driving force generation unit 20c 1 only as a representative of the driving force generation units that are the principal parts of the present invention in the image stabilization mechanism 20 as the stage apparatus according to the fourth embodiment of the present invention. In FIG. 12, some members are not shown and detailed shapes of other members are omitted. The screw 28 and the compression spacer 27 are added suitably and are shown.

Various directions and parts about the magnet 24 and the coil 25 will be defined in advance of the description about the characteristic feature of the Hulbach magnetic circuit.

Figure 13A:
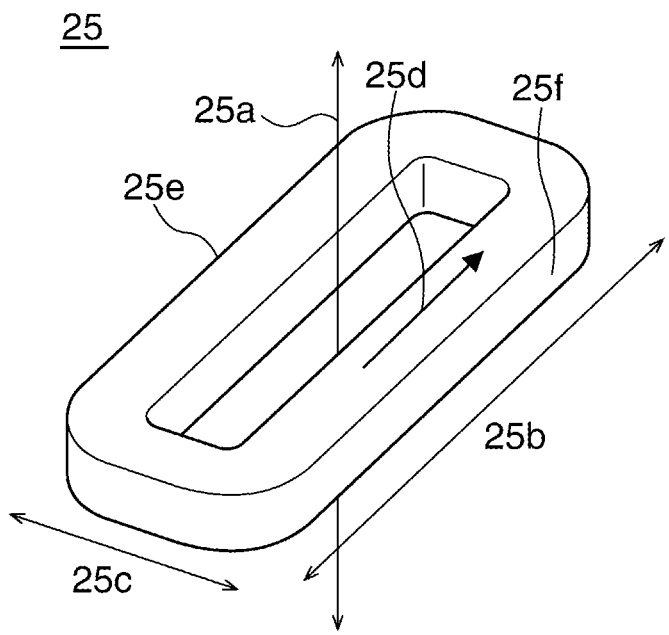
FIG. 13A and FIG. 13B are schematic views respectively showing a coil and a magnet in the fourth embodiment of the present invention.
Figure 13B:
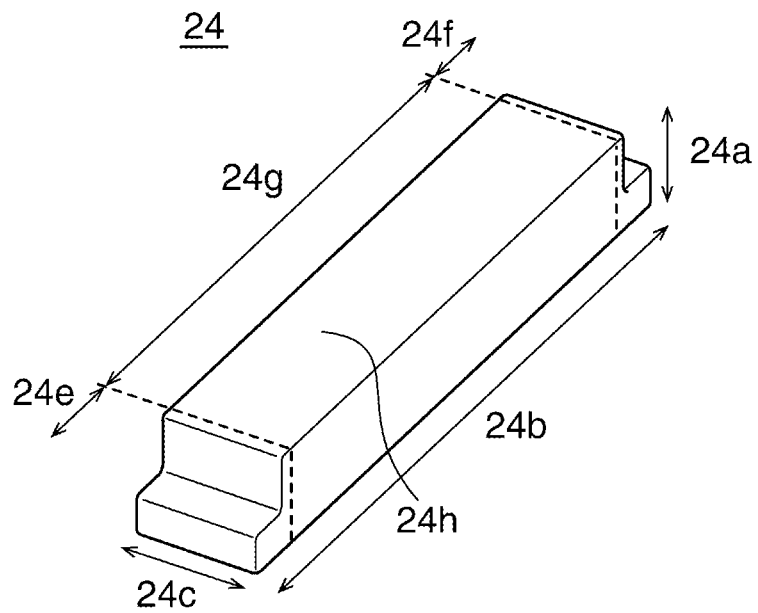

FIG. 13A and FIG. 13B are schematic views respectively showing the coil 25 and the magnet 24 in the fourth embodiment. The coil 25 is constituted by winding a conductor wire in a corner-rounded rectangle or an ellipse as shown in FIG. 13A. A winding-core direction 25a, a long side direction 25b, a short side direction 25c, and an energizing direction 25d are defined with respect to the coil 25. The long side direction 25b intersects perpendicularly with the winding-core direction 25a, and the short side direction 25c intersects perpendicularly with both the winding-core direction 25a and the long side direction 25b. Moreover, the energizing direction 25d rotates along the winding direction. Moreover, the coil 25 has two long side parts 25e and 25f extended in the long side direction 25b, as shown in FIG. 13A. Although the long side direction 25b and the short side direction 25c is used for convenience in the description, the present invention does not limit such a size relation. The parts extended in the short side direction 25c of the coil 25 may be longer than the long side parts 25e and 25f.

The magnet 24 has an approximately rectangular parallelepiped contour, as shown in FIG. 13B. A height direction 24a, a long side direction 24b, and a short side direction 24c are defined with respect to the magnet 24. The long side direction 24b intersects perpendicularly with the height direction 24a, and the short side direction 24c intersects perpendicularly with both the height direction 24a and the long side direction 24b. Moreover, although mentioned later for details, the magnet 24 has fixed parts 24e and 24f at both ends in the long side direction 24b, and has a coil facing part 24g between the fixed parts 24e and 24f except the fixed parts 24e and 24f in the long side direction 24b of the magnet 24. Furthermore, a flat surface opposite to the coil 25 in the coil facing part 24g is defined as a coil facing surface 24h. It should be noted that the present invention does not limit the size relation between the long side direction 24b and short side direction 24c of the magnet 24 as with the long side direction 25b and short side direction 25c of the coil 25. That is, the part extended in the short side direction 24c of the magnet 24 may be longer than the part extended in the long side direction 24b.

FIG. 14A through FIG. 14E are views for describing the configuration of the Hulbach magnetic circuit according to the fourth embodiment in the VCM method in comparison to a configuration of a general magnetic circuit. As mentioned above, FIG. 14A through FIG. 14E shows a part of the first driving force generation unit 20c1 in the image stabilization mechanism 20. It should be noted that arrows that show vertical and horizontal directions without numbers and symbols that show front-to-back and back-to-front directions show the magnetization directions of the magnet 24. That is, in the magnet 24, the entrance sides of these arrows and symbols exhibit the S pole, and the exit sides serves exhibit the N pole.

Figure 14A:
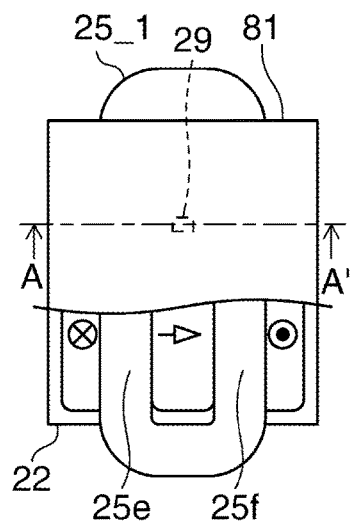
FIG. 14A through FIG. 14E are views for describing the configuration of the Hulbach magnetic circuit according to the fourth embodiment of the present invention in a voice coil motor method in comparison to a configuration of a general magnetic circuit.
Figure 14A:
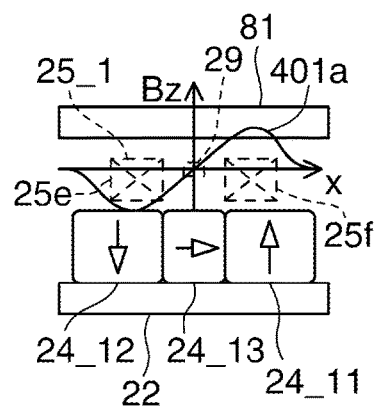
Figure 14B:
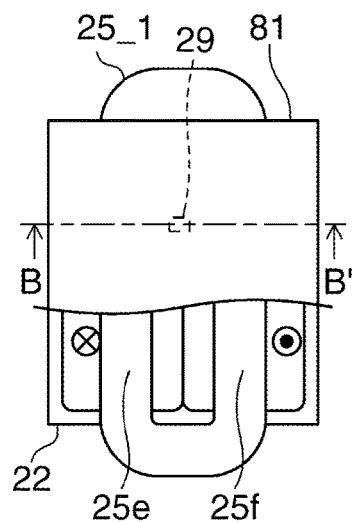
Figure 14B:
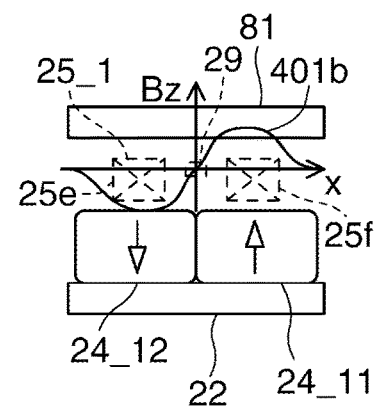
Figure 14C:
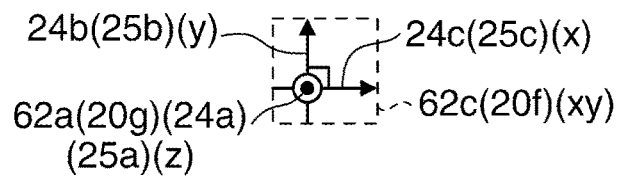
Figure 14C:
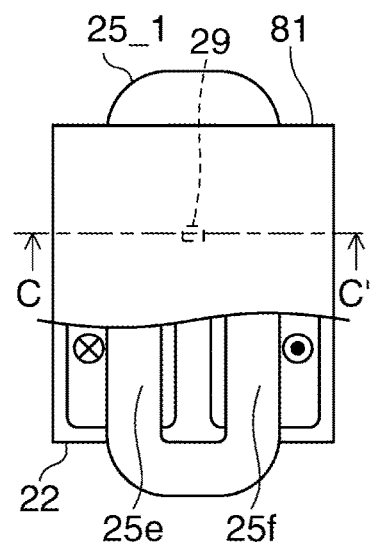
Figure 14C:
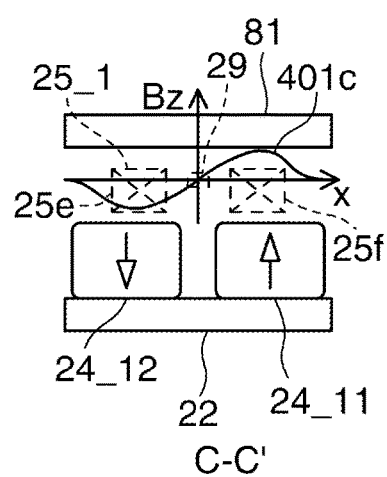
Figure 14D:
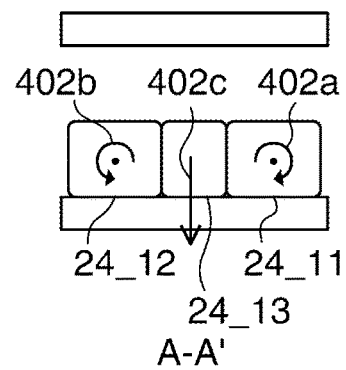
Figure 14E:
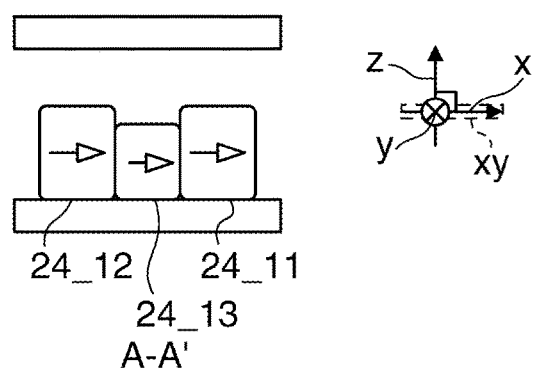

FIG. 14A is a view for describing the configuration of the Hulbach magnetic circuit according to the fourth embodiment, and FIG. 14B and FIG. 14C are views for describing configurations of general magnetic circuits. FIG. 14A, FIG. 14B, and FIG. 14C include top views of the first driving force generation unit 20c1, front sectional views projected with a third angle system, and qualitative flux density profiles 401a, 401b, and 401c. FIG. 14D and FIG. 14E include front sectional views. The flux density profiles 401a, 401b, and 401c affect the generation efficiency of the driving force in the coil 25 and the position detection accuracy by the magnetic field detecting element 29 as mention later. In addition, the arrangement directions for the top view shown in FIG. 14A are common to FIG. 14B and FIG. 14C. Moreover, the arrangement directions for the front sectional view in FIG. 14E are common to FIG. 14A through FIG. 14D.

Each of the flux density profiles shown in FIG. 14A, FIG. 14B, and FIG. 14C indicates the intensity of the magnetic flux density in the winding-core direction 25a of the coil 25_1 that affects the generation of the driving force and the position detection by the magnetic field detecting element 29 at each position in the short side direction 25c of the coil 25_1 that is a generation direction of the driving force. Hereinafter, the short side direction 25c of the coil 25_1 is defined as an x direction for convenience, and the winding-core direction 25a of the coil 25_1 is defined as a z direction for convenience. Since the flux density profile is almost constant within the rage of the two long side portions 25e and 25f of the coil 25_1 in the long side direction 25b of the coil 25_1 that intersects perpendicularly with both the above-mentioned x direction and z direction, one profile is illustrated as a representative. Hereinafter, the long side direction 25b of the coil 251 is defined as a y direction for convenience.

Moreover, FIG. 14D is a schematic view showing interaction of the forces between the first, second, and third magnets 24_11, 24_12, and 24_13 in the Hulbach magnetic circuit shown in FIG. 14A. Arrows 402a and 402b in FIG. 14D respectively show directions of moments of the forces that act on the magnets 24_11 and 24_12 mentioned later. Moreover, FIG. 14E is a schematic view showing the mutual arrangement where the magnets 24_11, 24_12, and 24_13 are finally stabilized by the interaction of the forces between the first, second, and third magnets 24_11, 24_12, and 24_13.

In the VCM method, the first, second, and third magnets 24_11, 24_12, and 24_13 are aligned in the short side direction 24c and are faced to the coil 25_1 in the height direction 24a as shown in the front sectional views in FIG. 14A, FIG. 14B, and FIG. 14C (the height direction 24a and the winding-core direction 25a are coincided). Furthermore, the long side direction 24b (i.e., the direction that intersects perpendicularly with the short side direction 24c that is the alignment direction of the first, second, and third magnets 24_11, 24_12, and 24_13 within the drive plane) of the first, second, and third magnets 24_11, 24_12, and 24_13 and the long side direction 25b of the coil 25_1 are coincided. The magnetization directions of the first, second, and third magnets 24_11, 24_12, and 24_13 are arranged so that opposite strong magnetic fields may be formed in the winding-core direction 25a that intersects perpendicularly with the energizing directions 25d near the long side portions 25e and 25f of the coil 25_1 in this state.

The general magnetic circuits shown in FIG. 14B and FIG. 14C satisfy the above-mentioned requirements briefly. That is, the magnetization direction of the first magnet 24_11 is in the drive-plane orthogonal direction 20g, and the magnetization direction of the second magnet 24_12 is in the opposite direction of that of the first magnet 24_11. Furthermore, the second and third stationary frames 22 and 81 as yokes that prevent leakage of magnetic flux are respectively arranged under the first, second, and third magnets 24_11, 24_12, and 24_13 and over the coil 25_1 in the drive-plane orthogonal direction 20g. Accordingly, the magnetic flux that comes out from the first magnet 24_11 toward the coil 25_1 goes into the second magnet 24_12 via the third stationary frame 81. In the meantime, the magnetic flux that comes out from the second magnet 24_12 in the direction opposite to the coil 25_1 returns to the first magnet 24_11 via the second stationary frame 22. Accordingly, the opposite strong magnetic fields are formed in the z direction near the long side portions 25e and 25f of the coil 25_1 that is arranged between the first, second, and third magnets 24_11, 24_12, and 24_13 and the third stationary frame 81 as shown in FIG. 14B and FIG. 14C. When an electric current is applied to the coil 25_1 in this state, the coil 25_1 generates driving force in the x direction because the directions of the Lorentz forces in the long side portions 25e and 25f coincide.

Moreover, the magnetic field detecting elements 29 are able to detect the positions in the general magnetic circuits shown in FIG. 14B and FIG. 14C. That is, as shown in FIG. 14B and FIG. 14C, the magnetic flux density in the z direction linearly varies in the x direction in the area between the long side portions 25e and 25f of the coil 25_1 in the x direction (the linearity of the magnetic circuit). Accordingly, when the magnetic field detecting element 29 that has a magnetic-field detection direction in the z direction is arranged in the area between the long side portions 25e and 25f in the x direction, the position change of the coil 25_1 in the x direction due to the driving force generated by energization is detectable with high sensitivity. Since details of the position detection method are not the principal part of the present invention, detailed descriptions are omitted.

The configuration of the magnetic circuit shown in FIG. 14C is the well-known technique that improves the linearity of the magnetic circuit mentioned above (enlarges the proportional region) by providing a cavity between the first magnet 24_11 and the second magnet 24_12 in the x direction. Thereby, the position detection accuracy is improved. In the meantime, the configuration of the magnetic circuit shown in FIG. 14B is inferior in the linearity of the magnetic circuit in comparison with the configuration shown in FIG. 14C, but is superior in the generation efficiency of driving force because the absolute value of magnetic flux density is improved.

In the meantime, the Hulbach magnetic circuit in the fourth embodiment shown in FIG. 14A is configured by arranging the third magnet 24_13 between the first magnet 24_11 and the second magnet 24_12. Furthermore, the third magnet 24_13 has a magnetization direction in the direction that has a pole in the same direction of the poles of the first magnet 24_11 and the second magnet 24_12 when viewed from the coil 25_1 side in the drive-plane orthogonal direction 20b as shown in FIG. 14A. Since the detail principle is well known, its description is omitted. The third magnet 24_13 reduces the magnetic flux leakage at the side of the coil 25_1 and the opposite side (the side of the second stationary frame 22) between the first magnet 24_11 and the second magnet 24_12 in the drive-plane orthogonal direction 20g. Accordingly, the configuration of the Hulbach magnetic circuit in FIG. 14A improves the magnetic flux density in the long side portions 25e and 25f of the coil 25_1 and improves the linearity of the magnetic circuit in comparison with the configurations of the general magnetic circuits shown in FIG. 14B and FIG. 14C. That is, the configuration of the Hulbach magnetic circuit in FIG. 14A raises both the generation efficiency of the driving force and the position detection accuracy in comparison with the configurations of the general magnetic circuits shown in FIG. 14B and FIG. 14C.

However, the configuration of the Hulbach magnetic circuit shown in FIG. 14A is unstable because the first magnet 24_11 and the second magnet 24_12 repulse mutually by the third magnet 24_13 as shown in FIG. 14D. That is, the third magnet 24_13 generates the moments of forces shown by the arrows 402a and 402b that rotate the first magnet 24_11 and the second magnet 24_12 around axes parallel to the long side direction 24b. This is due to the forces that the poles of the first and second magnets 24_11 and 24_12 are attracted by the opposite poles of the third magnet 24_13, i.e., the forces that form the mutual arrangement shown in FIG. 14E where the first, second, and third magnets 24_11, 24_12, and 24_13 are finally stabilized. About the third magnet 24_13, since the forces that are received from the first and second magnets 24_11 and 24_12 are balanced, such rotational force is not received. It should be noted that the third magnet 24_13 receives force in a direction of an arrow 402c as reactions of the rotational forces that exert on the first magnet 24_11 and the second magnet 2412. Details will be mentioned later.

Accordingly, when the configuration of the Hulbach magnetic circuit shown in FIG. 14A is used, it is necessary to consider a fixing method of the magnets 24 that regulates the rotations of the first and second magnets 24_11 and 24_12 around the axes parallel to the long side direction 24b as shown in FIG. 14D. Next, the fixing method of the magnets 24 in the configuration of the Hulbach magnetic circuit that is the principal part of the fourth embodiment will be described.

Figure 15C:
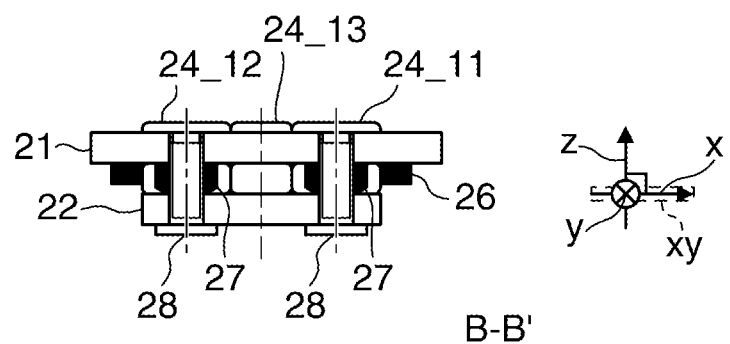
Figure 15D:
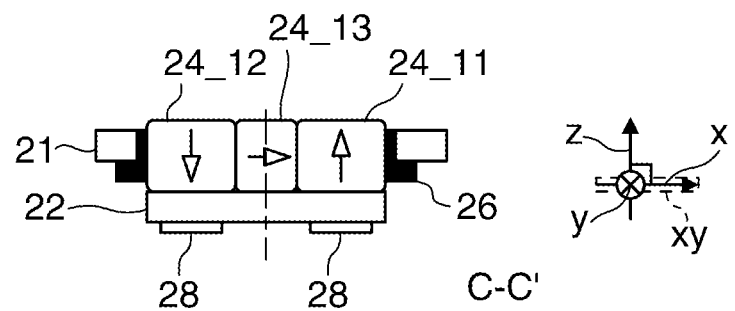

FIG. 15A through FIG. 15D are schematic views of the first driving force generation unit 20c1 in the image stabilization mechanism 20 in FIG. 12. FIG. 15A is a top view, FIG. 15B is a right-side sectional view (taken along a line A-A'), FIG. 15C and FIG. 15D are front sectional views (taken along lines B-B' and C-C').

Figure 20:
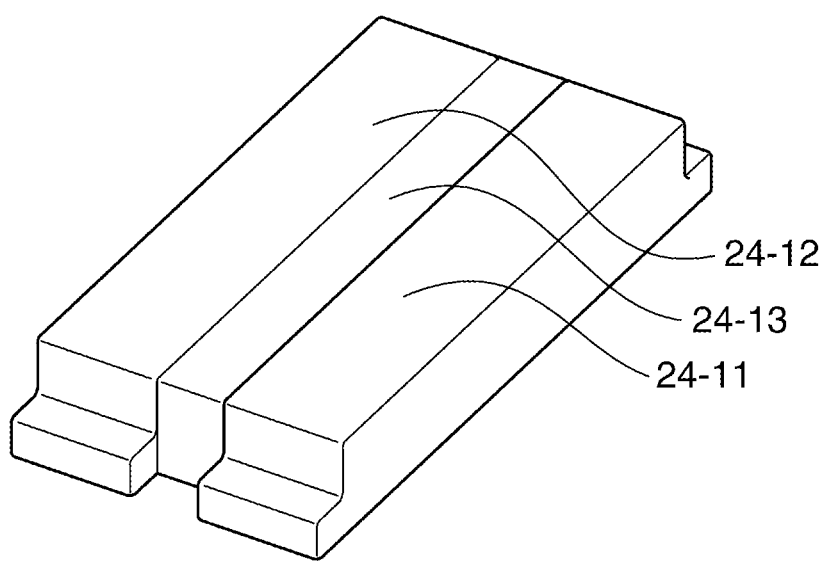
FIG. 20 is a view showing a modified example of the magnets in FIG. 13B.

As shown in FIG. 15A through FIG. 15D, the magnets 24 are fixed to regulate the rotations shown in FIG. 14D by nipping the fixed parts 24e and 24f of the both ends of the magnets 24 in the long side direction 24b by the first stationary frame 21 and the second stationary frame 22. In this case, the third magnet 24_13 is not necessarily fixed. For example, the magnets 24 may be configured so that the first and second magnets 24_11 and 24_12 have the fixed parts 24e and 24f in FIG. 13B and the third magnet 24_13 does not have the fixed parts like a modified example of the magnets 24 shown in FIG. 20. However, the third magnet 24_13 is also fixed by the same method in order to fix all the first, second, and third magnets 24_11, 24_12, and 24_13 more certainly in the fourth embodiment. A more detailed configuration is described in order.

In the fourth embodiment, the fixed parts 24e and 24f of the first, second, and third magnets 24_11, 24_12, and 24_13 are formed as a flanged shape that falls to form a step in the height direction 24a as mentioned above with reference to FIG. 13B. Thereby, the coil facing part 24g is projected in the height direction 24a. These fixed parts 24e and 24f are nipped between the second surface 21b of the first stationary frame 21 and the first surface 22a of the second stationary frame 22. Then, the second stationary frame 22 is fixed to the first stationary frame 21 by the screws 28. Thereby, since the rotations of the first magnet 24_11 and the second magnet 24_12 around the axes parallel to the long side direction 24b are regulated, the magnets 24 are certainly fixed.

In the above-mentioned configuration, the coil facing parts 24g of the first, second, and third magnets 24_11, 24_12, and 24_13 are inserted into the first opening 21c1 of the first stationary frame 21 in the drive-plane orthogonal direction. Accordingly, the coil facing surfaces 24h of the first, second, and third magnets 24_11, 24_12, and 24_13 are projected to the positions that are closer to the coil 25_1 (not shown) than at least the second surface 21b of the first stationary frame 21 in the drive-plane orthogonal direction 20g. Particularly in the fourth embodiment, the coil facing surfaces 24h are projected to the positions that are closer to the coil 25_1 (not shown) than the first surface 21a in the drive-plane orthogonal direction 20g. Accordingly, even if the first, second, and third magnets 24_11, 24_12, and 24_13 are nipped by the first stationary frame 21 and the second stationary frame 22, the first stationary frame 21 does not increase the distance between the coil 25_1 and the magnet in the drive-plane orthogonal direction 20g. Accordingly, the driving force generation unit is able to fix the magnets 24 without dropping the driving efficiency in the VCM method. Thus, the flanged shape of the fixed parts 24e and 24f falls to form the step that is larger than the thickness of the first stationary frame 21 in the height direction 24a (the drive-plane orthogonal direction 20g) in order to project the coil facing surface 24h in such a manner.

In the above-mentioned configuration, the compression spacer 27 plays a role to prevent collapse failure of the fixed parts 24e and 24f of the magnet 24 by the axial force of the screw 28 that co-fastens the first stationary frame 21, the second stationary frame 22, and the magnet 24. Accordingly, the compression spacer 27 is configured so that its natural length in the compression direction is higher than the fixed parts 24e and 24f of the magnet 24 and its compressed length is approximately equal to the height of the fixed parts 24e and 24f. Moreover, the magnet holder 26 intervenes between the edge of the first opening 21c1 of the first stationary frame 21 and the magnets 24 so as to prevent direct contact of the edge and magnets 24 in order to protect the magnets 24.

According to the above-mentioned configuration, since the magnets that form the Hulbach magnetic circuit are fixed mechanically, deviations of the magnets 24 due to the creep deformation that is feared if the magnets 24 are adhered are few and the magnets 24 are stably fixed.

The preferable configuration in the driving force generation unit that is the principal part of the present invention in the image stabilization mechanism 20 as the stage apparatus according to the fourth embodiment of the present invention was particularly described. Next, the preferable configuration of the entire image stabilization mechanism 20 will be described.

Figure 16A:
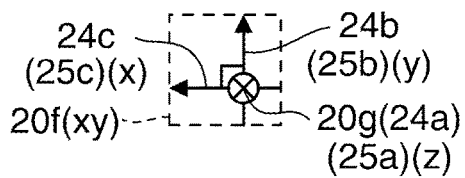
FIG. 16A, FIG. 16B, and FIG. 16C are views for describing arrangement relationships between magnets and screws in the first driving force generation unit in FIG. 12.
Figure 16A:
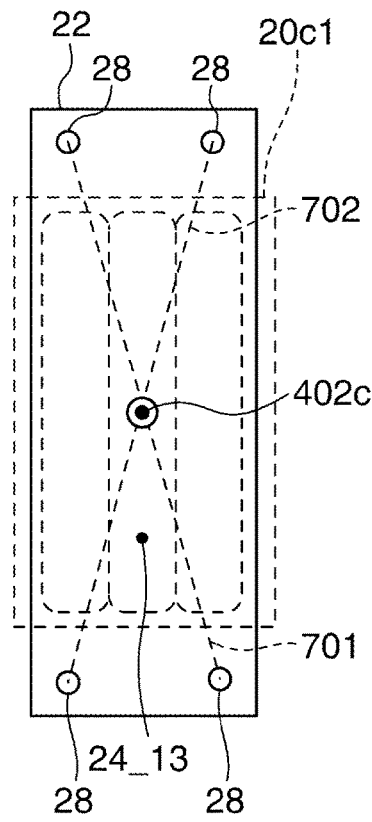
Figure 16B:
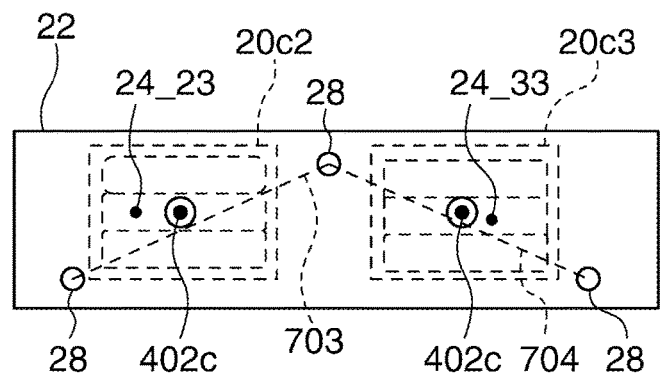
Figure 16C:
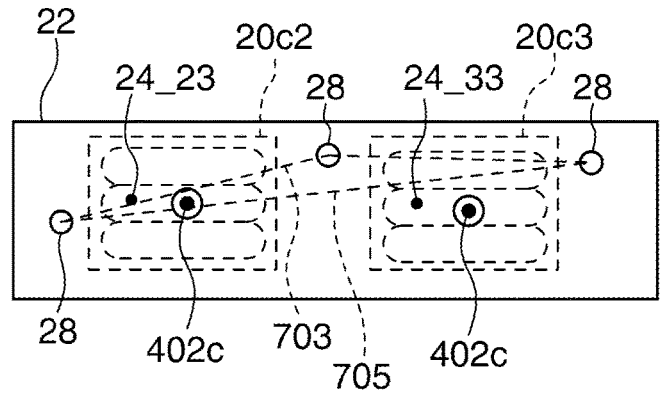

FIG. 16A, FIG. 16B, and FIG. 16C are views for describing arrangement relationships between the magnets 24 and screws 28 in the first driving force generation unit 20c1 in FIG. 12.

FIG. 16A, FIG. 16B, and FIG. 16C show only the portions around the first, second, and third driving force generation units 20c1, 20c2, and 20c3 viewed from the opposite side of the coils 25 in the drive-plane orthogonal direction 20g as shown in FIG. 12. The directions shown in FIG. 16A as a representative are common in FIG. 16B and FIG. 16C.

The screws 28 equivalent to locking members that fix the second stationary frame 22 to the first stationary frame 21 are preferably arranged so as to satisfy the following condition. That is, as shown in FIG. 16A and FIG. 16B, when the magnets 24 and the screws 28 are projected on the drive plane, at least one of line segments that connect the center points of the screws 28 meets each of the third magnets 24_13, 24_23, and 24_33.

A reason why this arrangement is required will be described. As described with reference to FIG. 14D, the third magnet 24_13 receives the force in the direction of the arrow 402c as reactions of the rotational forces that exert on the first magnet 24_11 and the second magnet 24_12. Accordingly, the third magnet 24_13 exerts the force on the second stationary frame 21 so as to rise from the first stationary frame 21. If the second stationary frame 22 rises, the rotations of the first and second magnets 24_11 and 24_12 will no longer be regulated, which deviates the arrangement of the magnets 24. Accordingly, the screws 28 are preferably arranged as mentioned above in order to suppress rising of the second stationary frame 22 by the third magnet 24_13. For example, line segments 701 and 702 among the line segments that connect the center points of the four screws 28 meet the third magnet 24_13 in the first driving force generation unit 20c1 in FIG. 16A, Thereby, the rising of the second stationary frame 22 by the third magnet 24_13 is prevented appropriately. Moreover, as shown in FIG. 16B, line segments 703 and 704 among line segments that connect the center points of the three screws 28 respectively meet the third magnets 24_23 and 24_33 in the driving force generation units 20c2 and 20c3. Thereby, the rising of the second stationary frame 22 by the third magnets 24_23 and 24_33 is prevented appropriately.

In the meantime, FIG. 16C shows an arrangement of the screws 28 that does not satisfy the above-mentioned condition. Specifically, since the line segments 703, 704, and 705 that connect the center points of the three screws 28 do not meet the third magnet 24_33 in the driving force generation units 20c2 and 20c3, the second stationary frame 22 may rise.

Figure 17A:
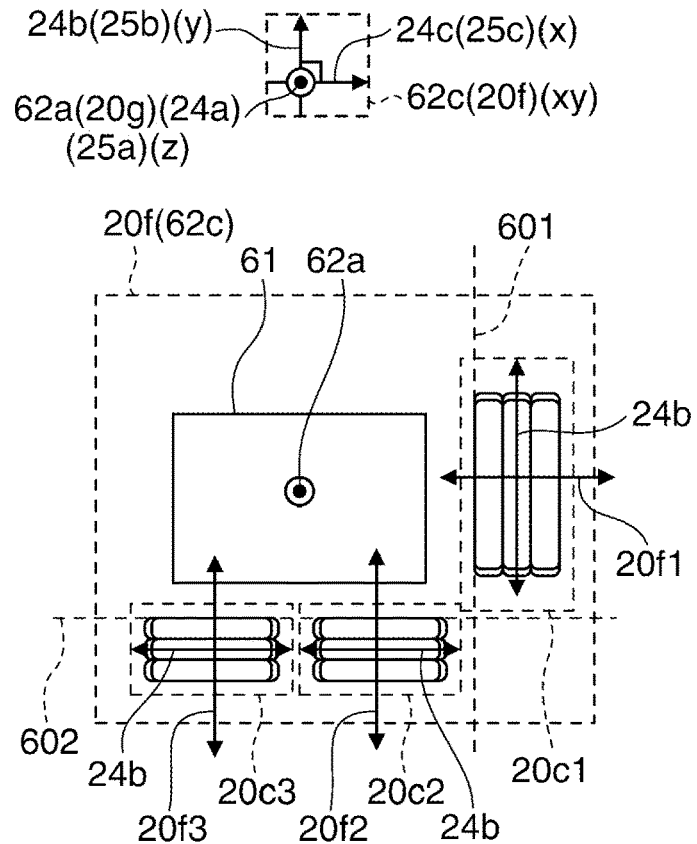
FIG. 17A and FIG. 17B are views for describing arrangements of the driving force generation units in the image stabilization mechanisms according to the fourth embodiment of the present invention.
Figure 17B:
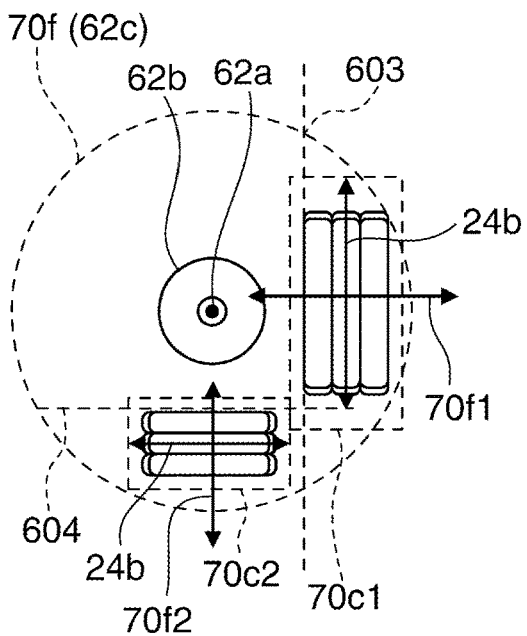

FIG. 17A and FIG. 17B are schematic views respectively showing the image stabilization mechanism 20, which includes the first, second, and third driving force generation units 20c1, 20c2, and 20c3, and the second image stabilization mechanism 70, which includes the first and second driving force generation units 70c1 and 70c2, according to the fourth embodiment.

FIG. 17A is a schematic view of the image stabilization mechanism 20, FIG. 17B is a schematic view of the second image stabilization mechanism 70. They are drawings viewed from the side of an object (not shown) in the optical axis direction 62a.

The first driving force generation unit 20c1 generates driving force in directions of a two-direction arrow 20f1 in FIG. 17A. Similarly, the other driving force generation units 20c2, 20c3, 70c1, and 70c2 generate driving forces in directions of two direction arrows 20f2, 20f 3, 70f1, and 7012, respectively. Arrangement directions of the image stabilization mechanism 20 shown in FIG. 17A as a representative are identical to arrangement directions of the second image stabilization mechanism 70 shown in FIG. 17B.

As mentioned above, the image stabilization mechanism 20 controls triaxial drive. Accordingly, at least three driving force generation units are provided, and it is preferable that driving force generation directions of at least one pair of the driving force generation units are approximately parallel and that driving force generation directions of another pair are approximately perpendicular. In FIG. 17A, the driving force generation directions (the directions of the two direction arrows 20f2 and 20f3) of the second and third driving force generation units 20c2 and 20c3 are approximately parallel. In the meantime, the driving force generation directions (the directions of the two direction arrows 20f1 and 20f2) of the first and second driving force generation units 20c1 and 20c2 are approximately perpendicular. Moreover, the driving force generation directions (the directions of the two direction arrows 20f1 and 20f3) of the first and third driving force generation units 20c1 and 20c3 are approximately perpendicular. Since at least three driving force generation units are provided as mentioned above, the pair of the driving force generation units of which the driving force generation directions are approximately perpendicular enable drive control of biaxial translation, and the pair of the driving force generation units of which the driving force generation directions are approximately parallel enable drive control of monoaxial rotation. Thereby, triaxial drive is controllable. Moreover, the second image stabilization mechanism 70 provides at least two driving force generation units and it is preferable that driving force generation directions of at least one pair of the driving force generation units are approximately perpendicular. In FIG. 17B, the driving force generation directions of the first and second driving force generation units 70c1 and 70c2 are approximately perpendicular. Since at least two driving force generation units are provided as mentioned above, biaxial translation is controllable.

Furthermore, since the driving force generation unit fixes the magnets 24 by nipping the fixed parts 24e and 24f at the both ends of the magnets 24 in the long side direction 24b in the fourth embodiment, the size in the long side direction 24b tends to become large in general. Accordingly, the driving force generation units of the image stabilization mechanisms should be arranged around the image pickup device 11 and the image stabilization lens 12b as the image stabilization element so that the long side directions 24b of the magnets 24 will be aligned along the outer peripheral direction. As shown in FIG. 17A, when the mechanisms are viewed from the side of the object (not shown) in the optical axis direction 62a, at least straight lines 601 and 602 that are formed by extending inside lines of the magnets 24 in the long side direction 24b do not meet the image pickup device 11. As shown by straight lines 603 and 604 in FIG. 17B, the driving force generation units 70c1 and 70c2 of the second image stabilization mechanism 70 should be arranged in the same manner. Thereby, the first image stabilization mechanism 20 and the second image stabilization mechanism 70 are constitutable without enlarging the contours.

The configuration in the fourth embodiment described above is able to stably fix the magnets that form the Hulbach magnetic circuit.

In a fifth embodiment, another fixing method for the magnets 24 as a modified example of the fourth embodiment will be described. As described hereinafter, a shape of the fixed part of a magnet in a driving force generation unit is not limited to the flanged shape like the fixed parts 24e and 24f of the magnets 24 in the fourth embodiment, and another shape may be employed.

Figure 18A:
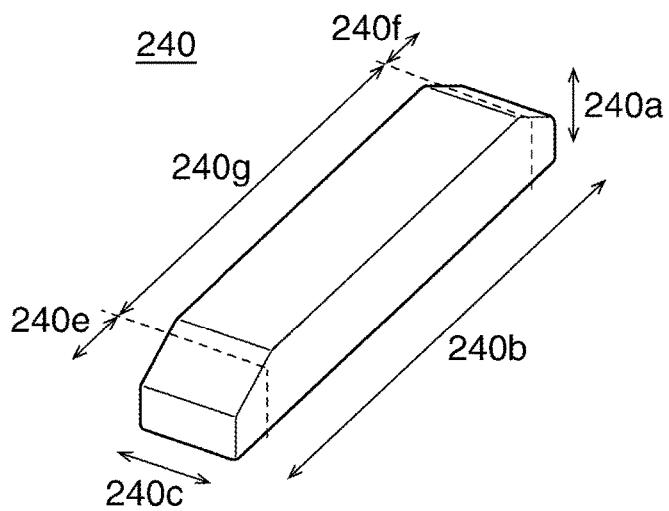
FIG. 18A, FIG. 18B, and FIG. 18C are schematic views showing a magnet and first stationary frames in a fifth embodiment of the present invention.
Figure 18B:
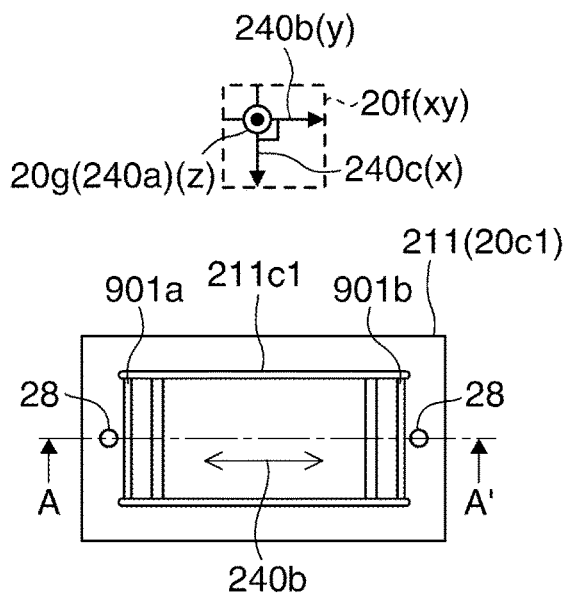
Figure 18B:
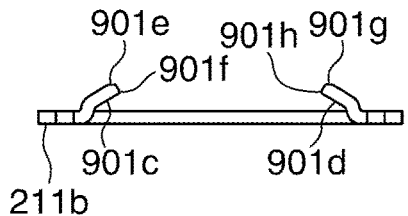
Figure 18B:
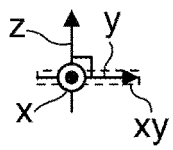
Figure 18C:
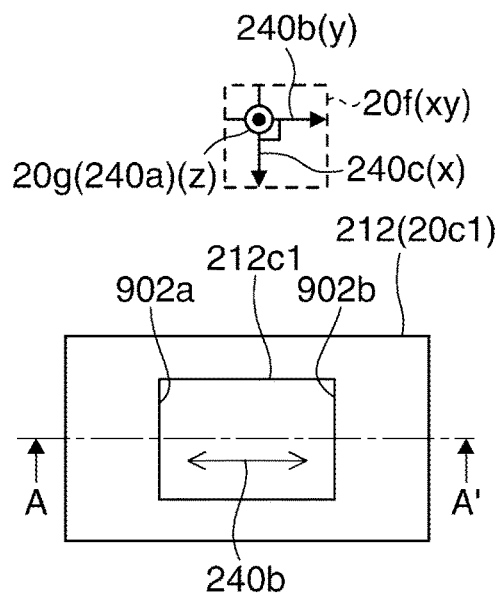
Figure 18C:
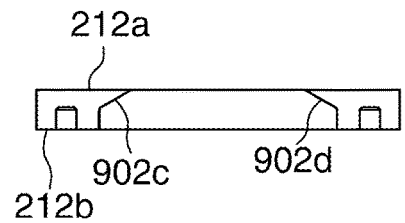
Figure 18C:
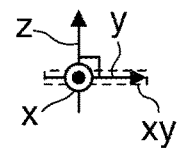

FIG. 18A, FIG. 18B, and FIG. 18C are schematic views showing a magnet and first stationary frames in the fifth embodiment.

FIG. 18A is a perspective view showing the magnet 240 in the fifth embodiment. As shown in FIG. 18A, fixed parts 240e and 240f at both ends of a coil facing part 240g of the magnet 240 in a long side direction 240b are shaped by chamfering both upper ends in a height direction 240a in the fifth embodiment Each of FIG. 18B and FIG. 18C includes a top view and a sectional view showing first stationary frames 211 and 212 in the fifth embodiment. Coordinate systems are shown in the top views and the sectional views in FIG. 18B and FIG. 18C. Only a portion corresponding to the first driving force generation unit 20c1 is illustrated as with FIG. 12. It should be noted that a first surface 212a and a second surface 212b of the first stationary frame 212 in FIG. 18C are defined as with the fourth embodiment. Since the first stationary frame 211 in FIG. 18B has standing bent parts mentioned later, only a second surface 211b is defined.

The first stationary frame 211 shown in FIG. 18B is constituted by a metal plate, for example, and is provided with a first opening 211c1. Furthermore, slant parts 901c and 901d are formed at short sides 901a and 901b of the first opening 211c1 by standing and bending at two or more times so that the slant parts 901c and 901d will contact with the fixed parts 240e and 240f at the time of fixing the magnet 240. Furthermore, edges 901e 901f, 901g, and 901h are removed by a cut-off process and a striking process.

The first stationary frame 212 shown in FIG. 18C is constituted by a molded resin member, for example, and is provided with a first opening 212c1. Furthermore, slant parts 902c and 902d are formed at short sides 902a and 902b of the first opening 212c1 so that the slant parts 902c and 902d will contact with the fixed parts 240e and 240f at the time of fixing the magnet 240.

Figure 19A:
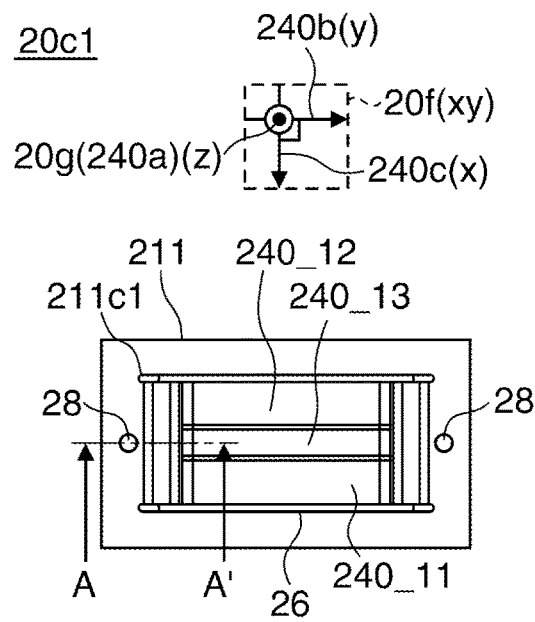
FIG. 19A and FIG. 19B are top views and partial sectional views of a first driving force generation unit of an image stabilization mechanism according to the fifth embodiment of the present invention.
Figure 19A:
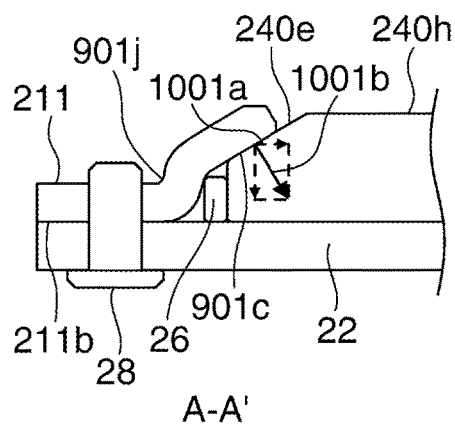
Figure 19A:
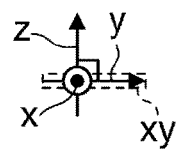
Figure 19B:
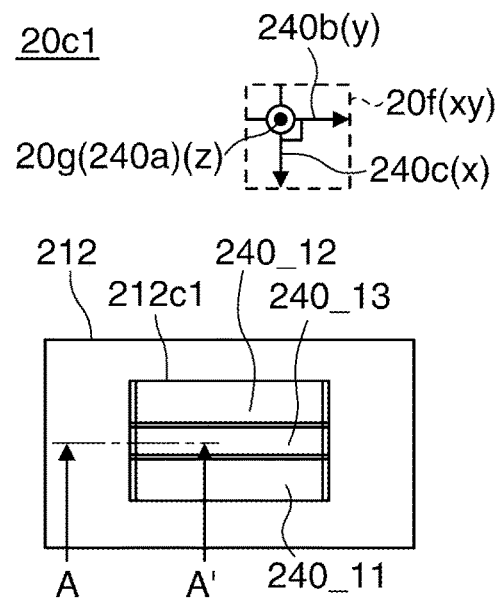
Figure 19B:
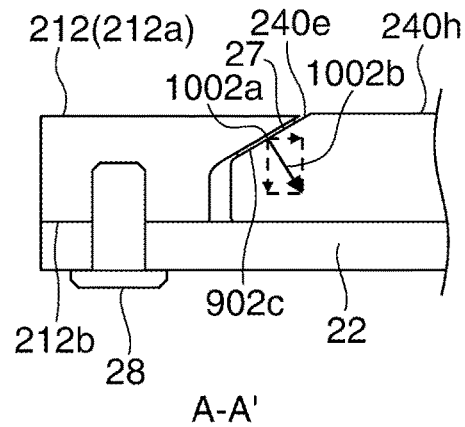
Figure 19B:
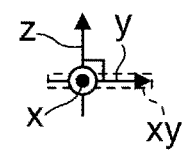

FIG. 19A and FIG. 19B are top views and partial sectional views of the first driving force generation unit 20c1 of an image stabilization mechanism 20 according to the fifth embodiment. FIG. 19A and FIG. 19B show two fixing methods for the magnet 240 using the first stationary frames 211 and 212 shown in FIG. 18A and FIG. 18B, respectively, and show both top views and partial sectional views of the first driving force generation units 20c1. Coordinate systems are shown in the top views and the sectional views in FIG. 19A and FIG. 19B.

In the configuration shown in FIG. 19A, a chamfer of the slant part 901c (901d) of the first stationary frame 211 contacts with the fixed part 240e (240f) of the magnet 240 near a point 1001a. Accordingly, when the second stationary frame 22 is fixed to the first stationary frame 211 by the screw 28, the magnet 240 receives fixing force 1001b in the approximately orthogonally crossing direction to the chamfer of the fixed part 240e (240f). Since the fixing force 1001b includes a component in the drive-plane orthogonal direction 20g, rotations of a first magnet 240_11 and a second magnet 240_12 of the magnet 240 are regulated and are fixed appropriately. Moreover, the coil facing surface 240h of the magnet 240 is projected to the position that is closer to the coil 25_1 (not shown) than the second surface 211b of the first stationary frame 211 in the drive-plane orthogonal direction 20g. Accordingly, the driving force generation unit is able to fix the magnet 24 without dropping the driving efficiency in the VCM method because the first stationary frame 211 does not increase the distance between the coil 25_1 and the magnet 240 in the drive-plane orthogonal direction 20g.

It should be noted that the configuration shown in FIG. 19A is able to absorb the axial force of the screw 28 to some extent because a standing bent part 901j at the short side 901a has flexibility in a bending direction. That is, the fifth embodiment does not need the compression spacer 27 that is used in the fourth embodiment.

In the configuration shown in FIG. 19B, the slant part 902c (901d) of the first stationary frame 212 contacts with the fixed part 240e (240f) of the magnet 240 near a point 1002a through the compression spacer 27. Accordingly, when the second stationary frame 22 is fixed to the first stationary frame 212 by the screw 28, the magnet 240 receives fixing force 1002b in the approximately orthogonally crossing direction to the chamfer of the fixed part 240e (240f). Since the fixing force 1002b includes a component in the drive-plane orthogonal direction 20g, rotations of the first magnet 240_11 and the second magnet 240_12 of the magnet 240 are regulated and are fixed appropriately. Moreover, the coil facing surface 240h of the magnet 240 is projected to the position that is closer to the coil 25_1 (not shown) than the second surface 212b of the first stationary frame 212. Particularly, the coil facing surface 240h is projected to the position that is closer to the coil 25_1 (not shown) than the first surface 212a in the fifth embodiment. Accordingly, the driving force generation unit is able to fix the magnet 24 without dropping the driving efficiency in the VCM method because the first stationary frame 212 does not increase the distance between the coil 25_1 and the magnet 240 in the drive-plane orthogonal direction 20g.

It should be noted that the configuration shown in FIG. 19B does not need the resin-made magnet holder 26 that is used as a shock absorber in the fourth embodiment because the first stationary frame 212 is a resin member and there are few acute edge parts around the first opening 212c1.

The configuration of the fifth embodiment has a characteristic feature that easily improves workability of the magnet in comparison with the fourth embodiment because stress risers in the contour of the magnet 240 is fewer than that of the magnet 24.

The image stabilization mechanism 20 for the image pickup device 61 of the camera 60 and the second image stabilization mechanism 70 for the image stabilization lens 62b were described as examples of the stage apparatus according to the fourth embodiment and the fifth embodiment with reference to FIG. 9 through FIG. 20. However, the concrete application examples of the stage apparatus are not limited to the above examples. The stage apparatus is widely applicable as a component of an electronic apparatus that performs image stabilization by electromagnetism driving force using the voice coil motor (VCM) method. As this electronic apparatus, an exposure device for manufacturing a semiconductor device, an exposure device for manufacturing an LCD device or a display device, an exposure device for manufacturing a thin film magnetic head, a micromachine, MEMS, or a DNA chip can be exemplified. Moreover, the first through fifth embodiments show the examples of the driving devices that have the characteristic feature in the magnetic circuit used for the drive unit, and the magnetic circuits described in the first through fifth embodiment are applicable to other than the usages described in the first through fifth embodiments.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-163481 filed Aug. 28, 2017 and No. 2018-038660 filed Mar. 5, 2018, which are hereby incorporated by reference herein in their entireties.

What is claimed is:

1. A drive apparatus comprising:
a stationary part configured to have a first stationary frame and a second stationary frame;
a movable part configured to perform translational movement relative to the stationary part in a first direction; and
a driving force generation unit configured to have a magnetic circuit fixed between the first and second stationary frames and a coil fixed to the movable part so as to face the magnetic circuit in a second direction that intersects perpendicularly with the first direction,
wherein the magnetic circuit is constituted by aligning a first magnet having a magnetization direction in the second direction, a second magnet having a magnetization direction opposite to the magnetization direction of the first magnet, and a third magnet provided between the first and second magnets,
wherein the third magnet has a magnetization direction in the direction that has a pole in the same direction of the poles of the first magnet and the second magnet when viewed from the coil side,
wherein fixed parts are formed at both ends of the first and second magnets in a third direction that intersects perpendicularly with an alignment direction,
wherein the first and second stationary frames fix the magnetic circuit by nipping the fixed parts of the first and second magnets in the second direction, and
wherein the first and second magnets are not nipped by the first and second stationary frames at A different part from the fixed parts in the second direction.

2. The drive apparatus according to claim 1, wherein the first and second magnets are provided with coil facing parts except the fixed parts in the third direction,
wherein the coil facing parts are projected to a position that is closer to the coil than the first stationary frame in the second direction, and
wherein the first stationary frame is provided with an opening into which the coil facing parts are inserted.

3. The drive apparatus according to claim 1, wherein the fixed parts of the first and second magnets are formed in a flanged shape that falls to form a step in a height direction that intersects perpendicularly with the first direction.

4. The drive apparatus according to claim 1, wherein the third magnet is provided with other fixed parts at both ends in a third direction.

5. The drive apparatus according to claim 2, further comprising a shock absorber that intervenes between the opening of the first stationary frame and the first, second, and third magnets.

6. The drive apparatus according to claim 1, further comprising a compression member nipped between the first and the second stationary frames.

7. The drive apparatus according to claim 1, further comprising locking members that fix the second stationary frame to the first stationary frame,
wherein the locking members are arranged so that at least one of line segments that connect center points of the locking members meets the third magnet when the third magnet and the locking members are projected on the drive plane.

8. The drive apparatus according to claim 1, wherein the first stationary frame is constituted by sheet metal material whose Young's modulus and surface hardness are higher than that of the second stationary frame, and the second stationary frame is constituted by sheet metal material whose magnetic permeability is higher than that of the first stationary frame.

9. The drive apparatus according to claim 1, wherein the movable part is rotatable relative to the stationary part.

10. The drive apparatus according to claim 1, further comprising an image stabilization element fixed to the movable part.

11. The drive apparatus according to claim 10, wherein the image stabilization element is an image pickup device.

12. The drive apparatus according to claim 10, wherein the image stabilization element is an image stabilization lens.

* * * * *